US012229783B2

(12) United States Patent
Lee et al.

(10) Patent No.: US 12,229,783 B2
(45) Date of Patent: Feb. 18, 2025

(54) INTELLIGENT SELF-SERVE DIAGNOSTICS

(71) Applicant: Microsoft Technology Licensing, LLC, Redmond, WA (US)

(72) Inventors: Jennifer Lee, Seattle, WA (US); Praveen Babu Tirumala, Issaquah, WA (US); Shekhar Gupta, Lynnwood, WA (US); Khaled Walid Mohamed Saeed Abbas Zayed, Seattle, WA (US); Yun Jung Choi, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 17/077,924

(22) Filed: Oct. 22, 2020

(65) Prior Publication Data
US 2022/0129906 A1    Apr. 28, 2022

(51) Int. Cl.
| G06Q 30/016 | (2023.01) |
| G06F 9/451 | (2018.01) |
| G06Q 10/0631 | (2023.01) |
| G06Q 10/0637 | (2023.01) |
| G06Q 10/10 | (2023.01) |
| G06Q 30/0201 | (2023.01) |
| G06F 40/279 | (2020.01) |

(52) U.S. Cl.
CPC .......... *G06Q 30/016* (2013.01); *G06F 9/451* (2018.02); *G06Q 10/06316* (2013.01); *G06Q 10/06375* (2013.01); *G06Q 10/10* (2013.01); *G06Q 30/0201* (2013.01); *G06F 40/279* (2020.01)

(58) Field of Classification Search
CPC ............ G06Q 10/10; G06Q 10/06316; G06Q 10/063; G06Q 10/06375; G06Q 30/0201; G06Q 30/016; G06F 9/451; G06F 40/279
See application file for complete search history.

(56) References Cited

U.S. PATENT DOCUMENTS 11,095,506 B1 *  8/2021  Erblat ................. H04L 41/0813
11,457,080 B1 *  9/2022  Meduri ................. H04L 67/60
(Continued)

OTHER PUBLICATIONS

Potharaju, R., Jain, N., & Nita-Rotaru, C. (2013). Juggling the jigsaw: Towards automated problem inference from network trouble tickets. (Year: 2013).*

*Primary Examiner* — William S Brockington, III
(74) *Attorney, Agent, or Firm* — RAY QUINNEY & NEBEKER; Tiffany Healy

(57) ABSTRACT

The systems and methods relate to a self-serve diagnostic experience that enables users to help themselves when issues or problems emerge with a customer workload. The systems and methods provide an interactive interface that guides users through a troubleshooting journey. Users may enter a problem with a customer workload using the interactive interface and may receive one or more insights automatically generated by one or more detectors based on an analysis of the backend telemetry data for the customer workload. The insights may provide contextual information about the issues and recommendations for steps to fix the issues. The interactive interface may also provide a visual overview of a plurality of resources, the resource dependencies, and the resource health for the plurality of resources. The systems and methods may also guide users in building one or more detectors for troubleshooting the one or more issues.

20 Claims, 13 Drawing Sheets

(56) References Cited

U.S. PATENT DOCUMENTS

| | | | | |
|---|---|---|---|---|
| 2014/0006861 | A1* | 1/2014 | Jain | G06N 20/00 714/E11.178 |
| 2015/0365309 | A1* | 12/2015 | Kaminski | H04L 47/70 709/224 |
| 2019/0266287 | A1* | 8/2019 | Chen | G06F 16/3329 |
| 2020/0110647 | A1* | 4/2020 | Souche | G06F 11/0709 |
| 2021/0021484 | A1* | 1/2021 | Sood | G06F 9/5005 |
| 2021/0075700 | A1* | 3/2021 | Palladino | H04L 43/062 |
| 2021/0243068 | A1* | 8/2021 | R | H04L 43/0823 |
| 2021/0263828 | A1* | 8/2021 | Gross | G06F 11/3433 |
| 2021/0279632 | A1* | 9/2021 | Di Pietro | G06N 5/04 |
| 2022/0036370 | A1* | 2/2022 | Rodman | G06Q 30/016 |
| 2022/0100851 | A1* | 3/2022 | Mehrotra | G06F 21/554 |

\* cited by examiner

App Service Diagnostics: Genie
An interactive self-serve diagnostics tool

Successful Checks (17)
Tests that succeeded

| Checks | Description | Link |
|---|---|---|
| Cold Starts | Cold starts for the application finished in less than 10 seconds | More info |
| Key Vault Application Settings Diagnostics | No errors related to Key Vault references found | More info |
| Check RunFromPackage Logs | No RunFromPackage logs found | More info |
| Application Crashes | No Application crashes detected during this timeframe | More info |
| Swap Effects on Availability | No swap operations occurred during this timeframe | More info |
| Memory Analysis | Memory Consumption below 80% on the instance(s) serving the app and private bytes consumption is within the safe limits | More info |
| Temp File Usage On Workers | Temp file space usage for all the worker instances is well below threshold | More info |
| SNAT Port Exhaustion | All SNAT connections were successful | More info |

1202 — (Cold Starts, Key Vault Application Settings Diagnostics, Check RunFromPackage Logs)
1204 — (Application Crashes, Swap Effects on Availability)
1206 — (Memory Analysis, Temp File Usage On Workers)

Recommended Documents

Having issues deploying my C# ASP NET WebApp to Azure

Hello, I wrote an ASP Net Web App which is basically a small REST API that does POST,GET,PUT and DELETE on my local machine. I used C#, Entity Framework, a local SQL Database to create it. When I do a dotnet build dotnet run on my local machine, I can launch the API Website without any problems.

Azure State Web Apps with NET and Blazor | ASP Net Blog

To deploy this app as an Azure Static Web App log into your Azure account (sign up for a free one here) and search for Static Web Apps Click Create, provide a Subscription, Resource Group and name for the application. Next, sign into GitHub and locate your GitHub repo (my-blazor-app) and select the branch you wish to deploy Did this information help you solve the issue? Yes No

INTELLIGENT SELF-SERVE DIAGNOSTICS

BACKGROUND

In the past several years, customers are not only increasing their usage on the cloud, but also deploying more workloads than ever before as they increase their cloud footprint. These workloads are made up of many different components that all work together to maintain high availability and prevent downtime for end users. The cloud industry has also grown in complexity with thousands of different offerings between the main cloud providers. Customers are using a variety of compute services of varying levels of abstraction for their business needs. With all the different moving pieces that customers have connected together, when customers run into issues with their cloud environment, it can be difficult for them to map the observed symptoms, isolate the actual problem, and figure out the fix or mitigation.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method. The method may include identifying one or more issues for a customer workload running on a cloud service provider. The method may include using a detector to automatically analyze backend telemetry data for the customer workload and generate one or more insights for the one or more issues observed in the backend telemetry data, wherein the detector is used to troubleshoot the one or more issues. The method may include adding at least one search term for the detector that includes key words or phrases that describe the one or more issues. The method may include storing the detector and the at least one search term in a datastore.

Another example implementation relates to a method. The method may include providing, via an interactive interface, a problem with a customer workload running on a cloud service provider. The method may include receiving, via the interactive interface, one or more insights for the problem automatically generated by at least one detector based on an analysis of backend telemetry data associated with the customer workload, wherein the one or more insights provide a summary of issues observed in the backend telemetry data and at least one recommended action to fix the issues. The method may include using the interactive interface to perform the at least one recommended action to fix the problem with the customer workload.

Another example implementation relates to a method. The method may include displaying, on an interactive interface, a resource mesh for a plurality of resources running on a cloud service provider, wherein the resource mesh visually represents resource dependencies of the plurality of resources and resource health of the plurality of resources. The method may include identifying one or more resource problems for the plurality of resources using the resource health of the plurality of resources. The method may include receiving, via the interactive interface, one or more insights automatically generated by one or more detectors based on an analysis of backend telemetry data for a customer workload for each resource of the plurality of resources, wherein the one or more insights provide a summary of issues observed in the backend telemetry data and at least one recommended action to fix the resource problems. The method may include using the interactive interface to perform the at least one recommended action to fix the resource problems with the customer workload for each resource of the plurality of resources.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 9 illustrates an example user interface screen illustrating an example detector in accordance with an implementation of the present disclosure.

FIG. 12 illustrates an example user interface screen for use with an interactive interface in accordance with an implementation of the present disclosure.

DETAILED DESCRIPTION

Figure 1:
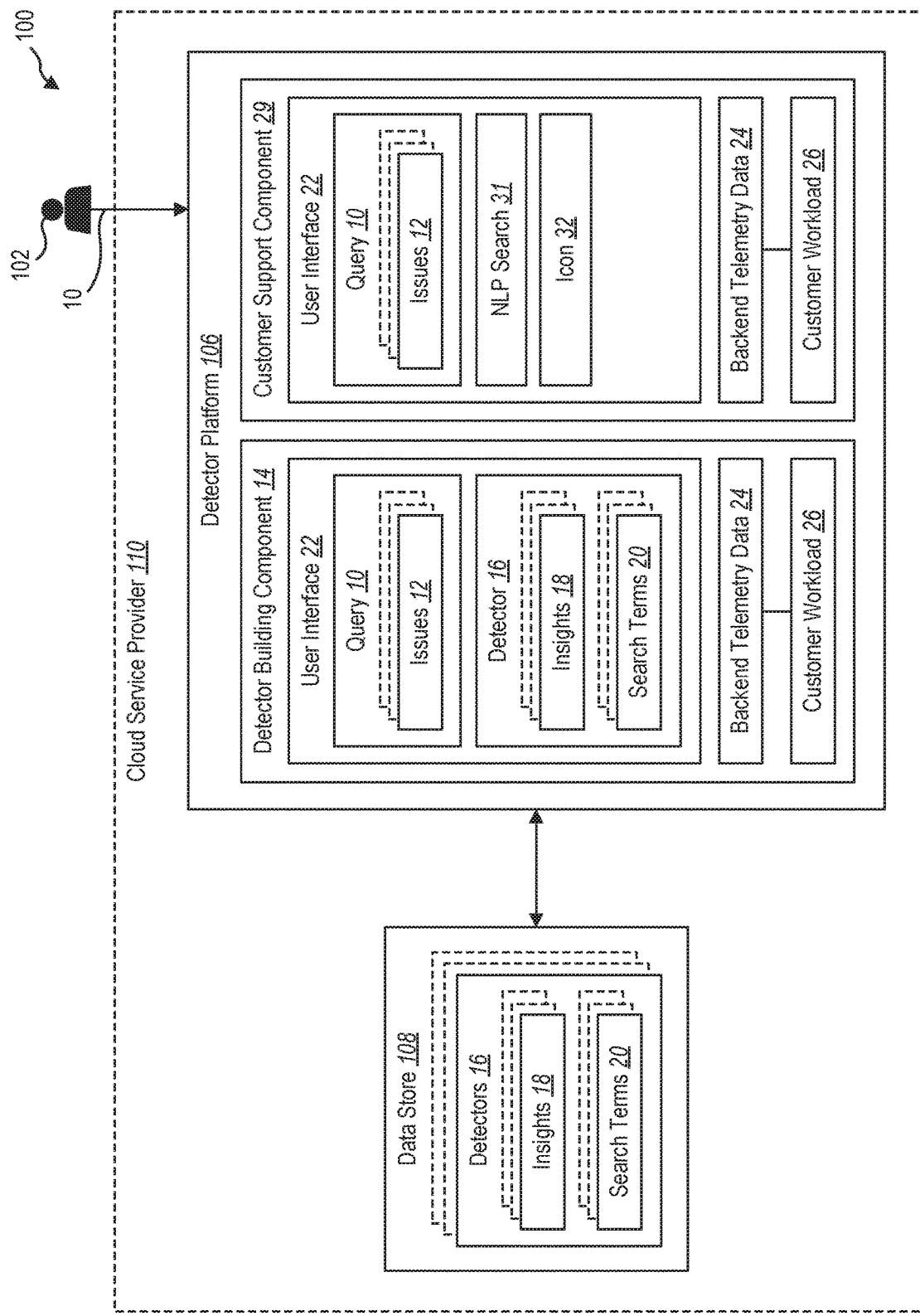
FIG. 1 illustrates an example environment for a detector platform for use with a cloud service provider in accordance with an implementation of the present disclosure.

This disclosure generally relates to diagnostics of workloads in a cloud environment. For cloud providers, making sure customers are successful on a platform may be paramount. In the past several years, increasing number of customers are not only increasing their usage on the cloud, but also deploying more mission critical workloads than ever before as they increase their cloud footprint. The services and workloads deployed by customers are running on infrastructures not owned by the customers. Moreover, these workloads are made up of many different components that work together to maintain high availability and prevent downtime for end users. The cloud industry has also grown in complexity with thousands of different offerings between the main cloud providers. From pure virtual machines (VM)s to completely serverless offerings and all the IaaS, PaaS, container, Kubernetes services in between, customers are using a variety of compute services of varying levels of abstraction for their business needs.

With all the different moving pieces that customers have connected together, when customers run into issues with their cloud environment, it may be difficult for the customers to map the observed symptoms, isolate the actual problem, and figure out the fix or mitigation. For example, if may be difficult for the customers to figure out without any additional help the symptoms for the issue; the next steps for solving the issue based on the symptoms; the root causes of the issue; and how to prevent the issue from happening again.

Current solutions include observability, monitoring, and logging platforms, which map out metrics, showcases data in dashboards, distributed tracing, and streams logs into a central place for debugging. While the data and logs are useful when trying to troubleshoot and debug an issue, it can be confusing to wade through that wealth of data, since the data lacks context and actionable next steps that the customer can then go and do to mitigate and fix the issue. When these customers are unable to figure out the issue through just digging through this data, the customers usually call their cloud provider's technical customer support team, who tries to troubleshoot the issue for the customer. Calling the technical support team also gives the customer a perspective from someone who has the context of issues with that particular cloud provider, leveraging the learnings of many customers to give valuable suggestions, and most importantly gives the customer a go forward plan, making sense of the complex data and metrics. However, by depending on customer support, it can leave the customer feeling helpless without the agency to figure out those next steps on their own.

When a customer faces an issue with a workload, the customer's priorities are to figure out how to fix the issue as soon as possible, understand what went wrong, and figure out how to prevent the issue from happening in the future. Instead, that process can be difficult, manual, and time consuming. There are many levels of complexity in terms of customer workloads, code-level issues, layers of abstraction in the cloud environment, which means that it is difficult for customers to figure out the root cause of the issue and the corresponding solution.

The present disclosure provides a guided, interactive, and/or intelligent diagnostic experience that enables customers to help themselves when issues or problems emerge with the customer's workloads. Workloads may include anything the customer is using the cloud service for. The present disclosure provides an interactive interface that guides users through a troubleshooting journey. The present disclosure includes several practical applications that provide benefits and/or solve problems associated with diagnostics of workloads in a cloud environment.

The present disclosure allows customers to interact via an interactive interface in a similar manner the customer interacts with a support engineer. One example of the interactive interface may include a chatbot-like interface with an intelligent search and detector and/or document integration. The interactive interface guides the customer through a troubleshooting journey.

The customer may type in or otherwise explain the issue and the interactive interface may run various checks on the backend telemetry to pinpoint pertinent issues with status icons (e.g., red, orange, and green status icons) along with troubleshooting next steps. The interactive interface may use a natural language processing (NLP) search on the issues to automatically select one or more detectors that match the issue the customer is having with the workload. Detectors may address one or more issues by automatically running and surfacing appropriate telemetry for the workload and provide insights to point out the cause of the issue and/or provide next steps to fix the issue in an understandable manner. The interactive interface provides observations of a particular workload and recommended next steps for the customer to take in the interactive interface.

The interactive interface increases customer engagement by providing contextual next steps to implement for solving the issues or preventing the issues from occurring in the future. In addition, the interactive interface allows customers to easily search for favorite detectors and/or discover detectors easily with more relevant detectors highlighted upfront.

The interactive interface may also provide proactive best practices for workload resiliency. The present disclosure may automatically analyze the customers' resources for production-grade best practices and may share improvements customers may make to ensure their workloads are healthy and resilient to downtimes.

The present disclosure may also provide a detector platform that allows users, such as, customers and support engineers, to build detectors. The detector platform provides users a simple diagnostic authoring experience to quickly build rich interactive diagnostics for issues related to a customer workload running on the cloud service provider. The detector platform allows users to build one or more detectors for an issue related to a customer workload and use the detectors to troubleshoot and solve issues with minimal effort.

A detector author may write a detector that takes in queries with a generic context and/or issues and translates the queries into user-friendly user experience with actionable insights and next steps. The telemetry to actionable next step experience provided by the detector platform provides a simple plug-and-play user interface that allows detector authors to input in a telemetry query and have the backend telemetry data related to the query show up in a easy to understand interface. As such, the detectors may intelligently show easy-to-understand diagnostic information for the issue.

The present disclosure may also provide a diagnostic mesh component that may provide a centralized and simplified resource management system and error detection process that allows the customers to troubleshoot a collection of resources instead of focusing only on a single resource. The customers may use the diagnostic mesh component for an overview of a collection of resources and to simplify the end-to-end self-serve diagnostics of the entire micro-services architecture for the customer resources.

The diagnostic mesh component may include an interactive interface the customers may access to view a resource mesh for a plurality of resources. The resource mesh may illustrate resource dependencies among the plurality of resources. For example, the resource mesh may illustrate a graph of the plurality of resources with the resource dependencies illustrated with a line between different resources. The resource mesh may also illustrate the resource health for each of the resources included in the plurality of resources.

The resource mesh may provide the customers with interactive visuals that quickly highlight unhealthy resources and promotes simple mitigation steps to fix or solve the problems. The resource mesh may allow customers to diagnose the customer workloads for the plurality of resources with intuitive visuals to show resource dependencies, resource health, and find relevant next steps for fixing the customer workloads. In addition, the resource mesh may provide early detection of potential issues and continuous best practices recommendations for the plurality of resources.

As such, the present disclosure empowers the customer and internal customer support engineers to self-diagnose and troubleshoot issues with customer workloads in a guided, scalable, easy-to-understand way that provides a significant advantage for cloud platform customers, enabling delivery of better customer satisfaction. In addition to increasing customer satisfaction, the present disclosure also deflects potential support cases from entering the customer support engineer support system, which not only saves the customer troubleshooting time also saves support costs. Thus, the present disclosure enables customers to help themselves when problems emerge with workloads in a cloud environment by providing guided, interactive, and intelligent troubleshooting and diagnostics experiences.

Referring now to FIG. 1, illustrated is an environment 100 for a detector platform 106 for use with a cloud service provider 110. The detector platform 106 provides users 102 a simple diagnostic authoring experience to quickly build rich interactive diagnostics for issues 12 related to a customer workload 26 running on the cloud service provider 110. An issue 12 may include any problem that occurred related to the customer workload 26. Examples of an issue 12 may include, but are not limited to, availability and performance issues (e.g., the customer workload 26 is down or slow) or configuration and management issues (e.g., the customer workload 26 is not scaling or upgrading as expected). The detector platform 106 allows users 102 to build one or more detectors 16 for an issue 12 related to a customer workload 26 and use the detectors 16 to troubleshoot and solve issues 12 with minimal effort. The customer workload 26 may include one or more components and applications that a customer is running on the cloud service provider 110. The customer workload 26 may be referred to as the work function (e.g., application or service) that is processed by a server that is remote and therefore in the cloud. Examples of customer workloads 26 may include, but are not limited to, e-commerce workloads, healthcare workloads, financial transactions, and/or business applications.

The detectors 16 may address one or more issues 12 identified for the customer workload 26 by automatically running and surfacing appropriate backend telemetry data 24 for the customer workload 26 and providing insights 18 to point out the cause of the issue 12 and/or provide next steps to fix the issue in an understandable manner. The detector platform 106 allows the users 102 to build a detector 16 once and leverage the detector 16 in a plurality of self-service troubleshooting and/or diagnostic experiences for the cloud service provider 110.

The detector platform 106 may include a detector building component 14 that allows the users 102 to build detectors 16 to troubleshoot and solve issues 12 with minimal effort. One example of the users 102 may include support engineers for the cloud service provider 110. The users 102 may leverage knowledge about the cloud service provider 110 and previous experiences in troubleshooting issues 12 relating to the customer workloads 26 when authoring the detectors 16. Another example of the users 102 may include a customer trying to self-serve or self-diagnose issues 12 related to the customer workload 26.

The users 102 may access a user interface 22 that will guide and/or aid the users 102 in building detectors 16. Examples of the user interface 22 may include, but are not limited to, an online code editor or a local development package. The user interface 22 may be a guided and/or interactive user interface 22 that allows simple, easy, and/or extensible detectors 16 to be written that analyze the backend telemetry data 24 for the customer workloads 26 and present the data to the user 102 with context.

A user 102 may use the interface 22 to provide a query 10 to the detector building component 14 that explains the one or more issues 12 related to the customer workload 26. The interface 22 may prompt, or otherwise guide, the user 102 in providing at title and/or description of the detector 16. The title and/or description may reflect the issues 12 or symptoms occurring within the customer workload 26.

The detector building component 14 may identify the backend telemetry data 24 associated with the customer workload 26. The backend telemetry data 24 may include all the information that may be required to troubleshoot the issues 12 or symptoms with the customer workload 26. The backend telemetry data 24 may include specific information relating to the cloud service provider 110 and/or information relating to one or more components of the customer workload 26.

The detector building component 14 may generate one or more insights 18 for the detector 16. Insights 18 may provide the users 102 an observation with a summary of the problem or issue 12 and one or more recommended actions that the users 102 may take to fix the problem or issue 12.

Each insight 18 may expand to provide a description to further explain what the insight 18 found in the backend telemetry data 24. A description may be necessary to expand on the problem or issue 12 and explain to the users 102 why the problem or issue 12 is occurring. One example description may include tables summarizing the information and data. Another example description may include graphs, both bar and line charts, summarizing the information and data. Another example description may include drop down formatting of the data where different data parameters may be selected that the data pivots on. Another example description may include markdowns. Markdowns may be used to further educate the users 102 about a particular problem or issue 12 or on the detector 16 itself. As such, the descriptions may provide different rendering types that allows the users 102 to easily visualize the reason why the problem or issue 12 may be occurring.

Each insight 18 may also include one or more recommended actions. The recommended actions may detail the next steps for the users 102 to take to address the problem or issue 12. One example recommended action may include a mitigation step that the user 102 may take. Another example recommended action may include directing the user 102 to a new blade. Another example recommended action may include details of how the users 102 may perform further investigations of the problem or issue 12. The recommended actions may be dynamically generated by the detector 16 and may include tables. In an implementation, the insights 18 may include document integration. Additional links to documentation may supplement the information provided in the insights 18. As such, the insights 18 may provide rich diagnostics and/or quick mitigations that provide interactive visuals with contextual information to recommend mitigation solutions for the issue 12.

The appropriate insights 18 may be generated by the detector 16 to point out to the users 102 the cause of the problem or issue 12 based on the backend telemetry data 24 that is returned for the customer workload 26. As such, each detector 16 may address one or more issues 12 by automatically running and surfacing the appropriate backend telemetry data 24 in an understandable and customer-friendly way. Moreover, the detectors 16 may provide rich diagnostics and quick mitigations of one or more issues 12 that occur relating to a customer workload 26.

Compared to merely just writing queries to analyze data over and over again or trying to understand a myriad of charts on a dashboard, a detector author may write a detector 16 that takes in queries 10 with a generic context and/or issues 12 and translates the queries 10 into user-friendly user experience with actionable insights and next steps. The telemetry to actionable next step experience provided by the detector building component 14 provides a simple plug-and-play user interface 22 that allows detector authors to input a telemetry query 10 and have the backend telemetry data 24 related to the query 10 show up in a easy to understand interface. As such, the detectors 16 may intelligently show easy-to-understand diagnostic information for the issue 12.

Multiple detectors 16 may be combined to visualize data and recommend catered solutions in an easy to use interface. If multiple detectors 16 address a similar situation, multiple detectors 16 may be combined into a single parent detector. For example, if there are three distinct detectors that help resolve SSL issues, all three detectors may be combined into a single parent detector. The parent detector may display in response to a query for an SSL issue, and each of the child detectors may be implemented by the parent detector.

The user interface 22 may also prompt the users 102 to enter one or more search terms 20 of natural language to associate with the detectors 16. The search terms 20 may include key words or phrases that describe the detector 16 and/or the issues 12 the detector 16 addresses. The search terms 20 may include different scenarios in which the users 102 may be helped by the detector 16. As such, the search terms 20 may allow discovery of the different detectors 16 by the users 102 using free-flowing language to describe an issue 12 or problem with a customer workload 26.

A datastore 108 in communication with the detector platform 106 may store the one or more detectors 16 once the detectors 16 are created. The datastore 108 may be accessed by internal troubleshooting experiences, such as, customer support engineers aiding a customer in solving one or more issues 12 with the customer workloads 26. In addition, the datastore 108 may be accessed by external facing experiences, such as, customer troubleshooting experiences so that customers may take advantage of the self-serve diagnostics experience provided by the detectors 16.

As such, the detector building component 14 allows the development of detectors 16 based off the backend telemetry data 24 of the cloud service provider 110 to surface up in multiple frontends, allowing for better developer effectiveness and efficiency in writing supportability tooling.

The detector platform 106 may also include a customer support component 29 to aid the users 102 in troubleshooting a problem description provided by a customer relating to a customer workload 26 on the cloud service provider 110. The customer support component 29 may be an intelligent diagnostics recommendation system that uses NLP searches 31 to show relevant diagnostics and/or documents to the users 102 based on a problem description provided by a customer.

A user 102 may receive a problem description provided by a customer for a customer workload 26. For example, the customer may call, or otherwise contact, the user 102 for help or support in solving the problem for the customer workload 26. The users 102 may provide a query 10 to the user interface with a description of one or more issues 12 occurring with the customer workload 26. The query 10 may use natural language to describe the issues 12. The customer support component 29 may run NLP searches 31 on the query 10 to identify one or more issues 12 described in the query 10. The customer support component 29 may perform a search in the datastore 108 for one or more detectors 16 with search terms 20 that correspond to the identified issues 12. The customer support component 29 may automatically select which detectors 16 to use in response to the problem the customer described for the customer workload 26.

In another implementation, the user 102 may select one or more detectors 16 to solve the issue 12 by navigating through different categories of the detectors 16 based on the problem description provided by the customer. The detectors 16 may be grouped into different categories using the search terms 20 associated with the detectors 16. The different categories may be created in response to common problems occurring in the customer workloads 26. As such, the users 102 may use the categories to quickly navigate to one or more detectors 16 to use for the problem description provided by the customer.

The one or more detectors 16 may access the backend telemetry data 24 for the customer workload 26 and may check the resources and provide one or more insights 18 with observations of what the detectors 16 observed and provide one or more recommended actions for recovering from the issues 12 and/or for fixing the issues 12. The insights 18 may intelligently recommend diagnostics based on the context of the backend telemetry data 24 for the customer workload 26 by explaining the issues 12 and providing steps or actions for fixing the issues 12. As such, the insights 18 may investigate the data of the backend telemetry data 24 and provide rich diagnostics and/or quick mitigations that provide interactive visuals with contextual information to recommend mitigation solutions for the issue 12.

The customer support component 29 may have an icon 32, such as a button, the user 102 may select to share the insights 18 received from the detectors 16 with the customer. The customer may be able to view the charts and/or diagrams with the explanation of the cause of the issues 12 and the recommended next steps for remedying the issues 12. The user 102 may share the insights 18 while communicating with the customer to provide the customer with contextual information about the cause of the issues 12 with easy to understand graphs and/or charts that allows the customer to visualize the data and understand the recommended solutions to fix the issues 12.

In addition, icon 32 may be used to automatically fix the issue 12. For example, the icon 32 may allow the user 102 to provide the customer with instructions that show the customer how to select an icon 36 (FIG. 2) and have the recommended next steps occur automatically to fix the issues 12. Thus, the customer support component 29 may provide quick mitigations to fixing the issues 12 with one click by selecting the icon 32 and automatically implementing the recommended next actions provided by the detectors 16 for solving the issues 12.

One example use case may include a customer calling a support engineer because the customer's application is experiencing downtime. The support engineer may type in a query 10 with text describing that the application is experiencing downtime for the customer workload 26. The customer support component 29 may perform an NLP search 31 on the query 10 and identify that the issue 12 is the application is experiencing downtime. The customer support component 29 may identify a detector 16 with a search term 20 of "application" and another search term 20 of "downtime." The customer support component 29 may use the identified detector 16 to analyze the backend telemetry data 24 for the customer workload 26 and may provide an insight 18 explaining that the detector 16 observed high CPU usage resulting in the application experiencing downtime for the customer workload 26. The insight 18 may also provide one or more actions to lower the CPU usage. The support engineer may share the insights 18 with the customer and provide the customer with instructions that are easily copied and paste-able that show the customer how to select an icon and automatically implement the actions to lower the CPU usage and fix the application for the customer workload 26.

In an implementation, if the customer support component 29 does not identify a detector 16 with at least one search term 20 that corresponds to the identified issues 12, the user interface 22 may allow the user 102 to access the detector building component 14 and create a new detector 16 for the identified issues 12 for the customer workload 26. As such, the users 102 may create new detectors 16 while helping a customer troubleshoot the issues 12 so that the new detector 16 may be available to help with troubleshooting the issues 12 in the future.

As such, the customer support component 29 may convert queries 10 with a generic context and/or issues 12 and translates the queries 10 into user-friendly user experience with actionable insights and next steps.

Each of the components 14, 28 of the detector platform 106 may be in communication with each other using any suitable communication technologies. In addition, while the components 14, 28 of the detector platform 106 are shown to be separate, any of the components or subcomponents may be combined into fewer components, such as into a single component, or divided into more components as may serve a particular implementation. As an illustrative example, components 14, 18 may be implemented on different server devices of the cloud service provider 110. As another illustrative example, one or more of the components 14, 18 may be implemented on an edge computing device that is not implemented on the hierarchy of devices of the cloud service provider 110.

Moreover, the components 14, 18 of the detector platform 106 may include hardware, software, or both. For example, the components of the detector platform 106 may include one or more instructions stored on a computer-readable storage medium and executable by processors of one or more computing devices. When executed by the one or more processors, the computer-executable instructions of one or more computing devices can perform one or more methods described herein. Alternatively, the components 14, 18 of the detector platform 106 may include hardware, such as a special purpose processing device to perform a certain function or group of functions. Additionally, or alternatively, the components 14, 18 of the detector platform 106 may include a combination of computer-executable instructions and hardware.

As such, the detector platform 106 may provide an intuitive platform to quickly build rich interactive diagnostics that may translate into user-friendly actionable information to aid customers and/or users 102 in troubleshooting problems or issues 12 with customer workloads 26.

Figure 2:
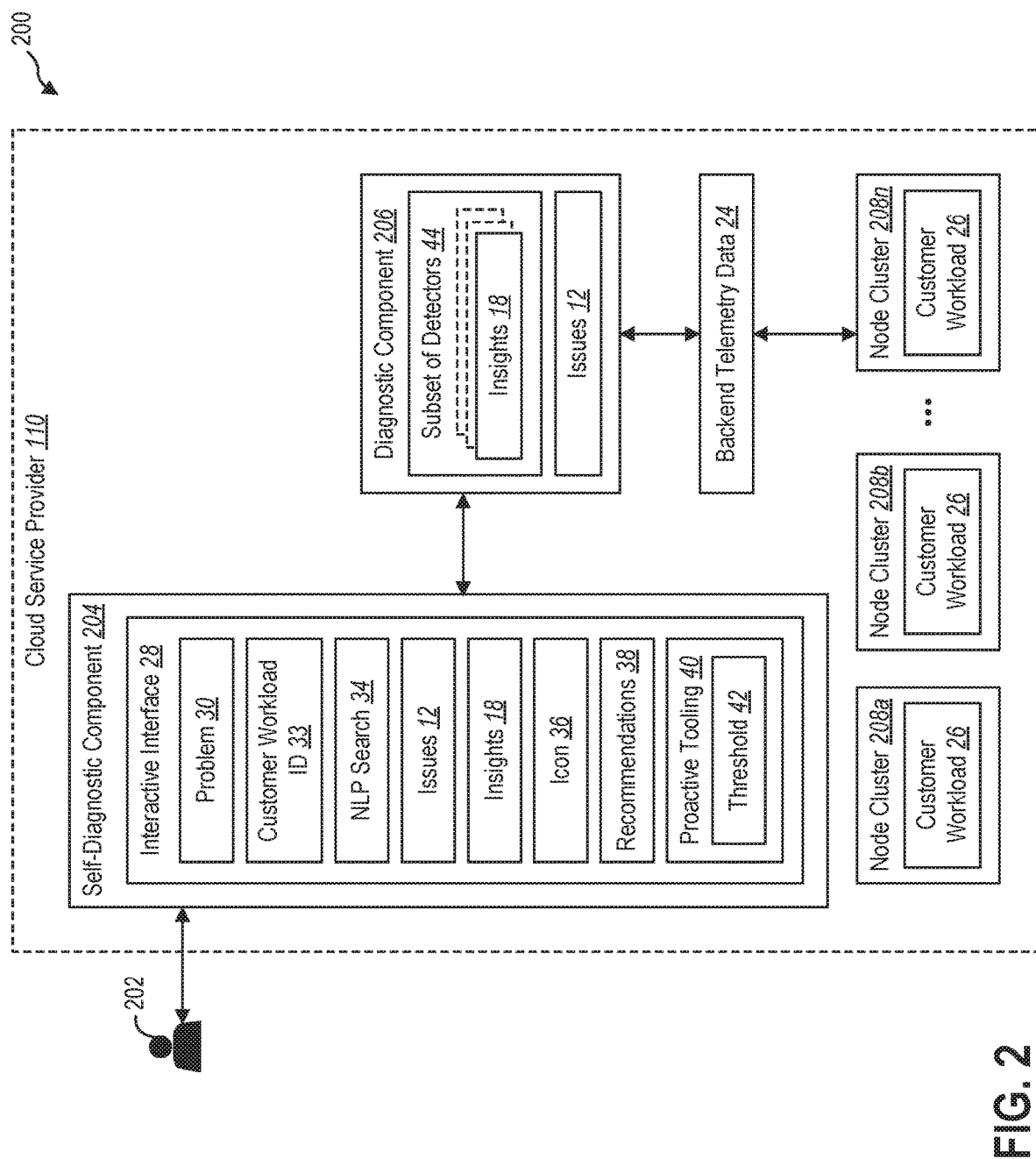
FIG. 2 illustrates an example environment for a self-diagnostic component for use with a cloud service provider in accordance with an implementation of the present disclosure.

Referring now to FIG. 2, illustrated is an example environment 200 with a self-diagnostic component 204 for use with a cloud service provider 110. The self-diagnostic component 204 may be accessed by a customer 202 of the cloud service provider 110, for example, through a portal for the cloud service provider 110 where the customer 202 may receive information about the customer workloads 26 running on the cloud service provider 110. Customers 202 may use the self-diagnostic component 204 to troubleshoot and/or solve problems with the customer workloads 26 on their own.

One or more customer workloads 26 may be running on any number of node clusters 208a-n of the cloud service provider 110. The node clusters 208a-n may be grouped by geographic location (e.g., a region of node clusters). The node clusters 208a-n may also be implemented across multiple geographic locations (e.g., at different datacenters including one or multiple node clusters). Each of the node clusters 208a-n may include a variety of server nodes having a number and variety of compute cores thereon. In addition, one or more virtual machines may be implemented on the compute cores of the server nodes. Some or all the compute cores may include virtual machine(s) implemented thereon. The cloud service provider 110 may include multiple node clusters 208a-n.

The self-diagnostic component 204 may include an interactive interface 28 the customer 202 may use in troubleshooting or solving a problem with a customer workload 26. In an implementation, the interactive interface 28 may be a chatbot-like experience that simulates how a customer support engineer would guide a customer through the problem, observations, and the suggested solutions. The interactive interface 28 may combine part of a chatbot while infusing text, visual cues, charts, and/or actionable next steps that gives the customers 202 a guided experience and provides context to the data relating to the customer workload 26.

The customer 202 may use the interactive interface 28 to enter in a problem 30 they are facing with one or more customer workloads 26. The problem 30 may include different words or phrases that describe what is wrong with the customer workload 26 or what might be occurring with the customer workload 26. The problem 30 may also provide a customer workload identification (ID) 33 to identify which customer workload 26 is experiencing the problem 30.

The interactive interface 28 may perform an NLP search 34 on the problem 30 provided by the customer 202 using a NLP search engine. The NLP search 34 may identify one or more key words or issues 12 that the customer 202 is experiencing with the customer workload 26. The interactive interface 28 may send the identified issues 12 and/or key words, along with the customer workload ID 33 to a diagnostic component 206.

The diagnostic component 206 automatically analyzes which detectors 16 may be useful for the problem 30 and identify a subset of detectors 44 to use for the problem 30. For example, the diagnostic component 206 may search a datastore 108 of detectors 16 to identify one or more detectors 16 with search terms 20 that match the identified keywords or issues 12. If one or more search terms 20 for a detector 16 matches the identified keywords or issues 12, the diagnostic component 206 may add the detector 16 to the subset of detectors 44. As such, the subset of detectors 44 may include a single detector 16 or a plurality of detectors 16.

The diagnostic component 206 may run the subset of detectors 44 on the backend telemetry data 24 associated with the customer workload 26 identified by the customer workload ID 33. The subset of detectors 44 may generate insights 18 based on the backend telemetry data 24 for the customer workload 26. The diagnostic component 206 may send the insights 18 to the interactive interface 28 for presentation.

In another implementation, the customer 202 may search through a listing of detectors 16 with descriptions for the detectors 16. The customer 202 may select the subset of detectors 44 to use for the problem 30. For example, the customer 202 may select different detectors 16 to include in the subset of detectors 44 based on the key words or phrases used to describe the issues 12 that the detectors 16 address or solve. The customers 202 may easily search for favorite detectors 16 and detector discovery is easier with the more relevant detectors 16 highlighted upfront.

The interactive interface 28 may display the insights 18 received from the diagnostic component 206 for the customer 202 to view and/or analyze. For example, the interactive interface 28 may display the insights 18 in a widget that is interactive and helps the user analyze from the most important issues relative to less important issues. The interactive interface 28 may also integrate documentation identified that may be helpful to the customer 202 in the insights 18. The interactive interface 28 may break down the information provided in the insights 18 into observations and recommended actions to give the customers 202 context on what to do next to fix or remedy the problem 30. As such, the insights 18 provided by the subset of detectors 44 may be embedded into the interactive, guided user experience that the self-diagnostic component 204 offers the customers 202.

The interactive interface 28 may also provide an icon 36 the customer 202 may to select to automatically fix the problem 30. For example, the icon 36 may be a button with a label "Fix It" that the customer 202 may select. Upon the customer 202 selecting the icon 36, the interactive interface 28 may communicate with the diagnostic component 206 to automatically implement one or more of the recommended next steps or actions provided in the insights 18 to fix or otherwise remedy the problem 30 with the customer workload 26.

The interactive interface 28 allows the customers 202 to provide descriptions of the issues 12 the customers 202 may be experiencing with the customer workloads 26 and interact with the detectors 16 in the datastore 108. The interactive interface allows the customers 202 to receive recommended actions to further troubleshoot the issues 12. As such, the interactive interface 28 provides an interactive self-diagnostics experience that provides customers 202 with an easy and comprehensive way to prevent and self-diagnose problems with the customer workloads 26, so customers 202 may solve issues on their own effectively.

The interactive interface 28 may also provide one or more recommendations 38 the customer 202 make take to improve the customer workloads 26 or help keep the customer workloads 26 resilient to issues that may prevent the customer workloads 26 from operating effectively. The recommendations 38 may include proactive best practices the customer 202 may implement for the customer workloads 26.

The interactive interface 28 may send a message to the diagnostic component 206 with a customer workload ID 33 that identifies a customer workload 26. The diagnostic component 206 may automatically select one or more detectors 16 from the datastore 108 to include in a subset of detectors 44 to run on the backend telemetry data 24 for the customer workload 26. The subset of detectors 44 may run potential checks on the customer workload 26 and may surface insights 18 with recommendations 38 for keeping the downtime for the customer workload 26 low and/or keeping the customer workload 26 resilient to issues 12 that may prevent the customer workload from operating correctly.

The diagnostic component 206 may analyze the customers' 202 resources for production-grade best practices and may share recommendations 38 with improvements the customers 202 may make to ensure the customer workloads 26 are healthy and resilient to downtimes. As such, the recommendations 38 may aid the customer 202 in maintaining healthy customer workloads 26 on the cloud service provider 110.

The interactive interface 28 may also allow the customer 202 to establish proactive tooling 40 to automatically run on the customer workloads 26 and/or customer resources on the cloud service provider 110 to identify when the customer workloads 26 and/or customer resources may have a problem or issues 12. The proactive tooling 40 may automatically take mitigative actions to fix the problem or issues 12.

The proactive tooling 40 may continuously run in the background and collect, for example, memory dumps or other logs for the customer workloads 26 and/or customer resources. The customer 202 may set one or more thresholds 42 for different customer resources and/or the customer workloads 26. The thresholds 42 may identify a level when the customer workload 26 and/or the customer resource may not work correctly. Upon the customer resource and/or the customer workload 26 reaching or exceeding the threshold 42, the proactive tooling 40 may take steps or mitigative actions to automatically fix the problem or issue 12 and/or provide information to further trouble shoot the problem or issue 12. As such, the proactive tooling 40 may automatically heal or fix specific set conditions by the customer 202 in response to the customer workloads 26 and/or customer resources meeting or exceeding one or more thresholds 42.

Each of the components of the self-diagnostic component 204 and/or the diagnostic component 206 may be in communication with each other using any suitable communication technologies. In addition, while the components of the self-diagnostic component 204 and/or the diagnostic component 206 are shown to be separate, any of the components or subcomponents may be combined into fewer components, such as into a single component, or divided into more components as may serve a particular implementation. As an illustrative example, the components may be implemented on different server devices of the cloud service provider 110. As another illustrative example, one or more of the components may be implemented on an edge computing device that is not implemented on the hierarchy of devices of the cloud service provider 110.

Moreover, the components of the self-diagnostic component 204 and/or the diagnostic component 206 may include hardware, software, or both. For example, the components of the self-diagnostic component 204 and/or the diagnostic component 206 may include one or more instructions stored on a computer-readable storage medium and executable by processors of one or more computing devices. When executed by the one or more processors, the computer-executable instructions of one or more computing devices can perform one or more methods described herein. Alternatively, the components of the self-diagnostic component 204 and/or the diagnostic component 206 may include hardware, such as a special purpose processing device to perform a certain function or group of functions. Additionally, or alternatively, the components of the self-diagnostic component 204 and/or the diagnostic component 206 may include a combination of computer-executable instructions and hardware.

The self-diagnostic component 204 may provide the customers 202 interactive troubleshooting by accessing the interactive interface 28 that guides the customers 202 through a troubleshooting journey. The customers 202 may interact via a chatbot-like interface with intelligent search and detector 16 integration. The self-diagnostic component 204 may provide the customers 202 guided and interactive experiences powered by intelligent NLP-search capabilities and may set up proactive auto-heal capabilities.

The self-diagnostic component 204 may also provide the customers 202 intelligent diagnostics by running various checks on the backend telemetry data 24 to pinpoint pertinent issues 12 on customer workloads 26 with status icons (e.g., red, orange, and green status icons) along with troubleshooting next steps. The self-diagnostic component 204 may run checks on the backend telemetry data 24 and get observations and recommended solutions to troubleshoot issues.

The self-diagnostic component 204 may also provide the customers with proactive best practices to implement for resiliency of the customer workloads 26. The customers 202 may use the self-diagnostic component 204 to learn best practices to implement for improving the performance and resiliency of the customers' 202 resources and/or the customer workloads 26.

The customers 202 may be able to use the self-diagnostic component 204 straight out-of-the box without extra configurations required via the portal of the cloud service provider 110. As such, the self-diagnostic component 204 provides customers 202 with a guided and interactive self-diagnostic experience that allows customers 202 to start their troubleshooting process easily and efficiently and also find proactive best practices.

Figure 3:
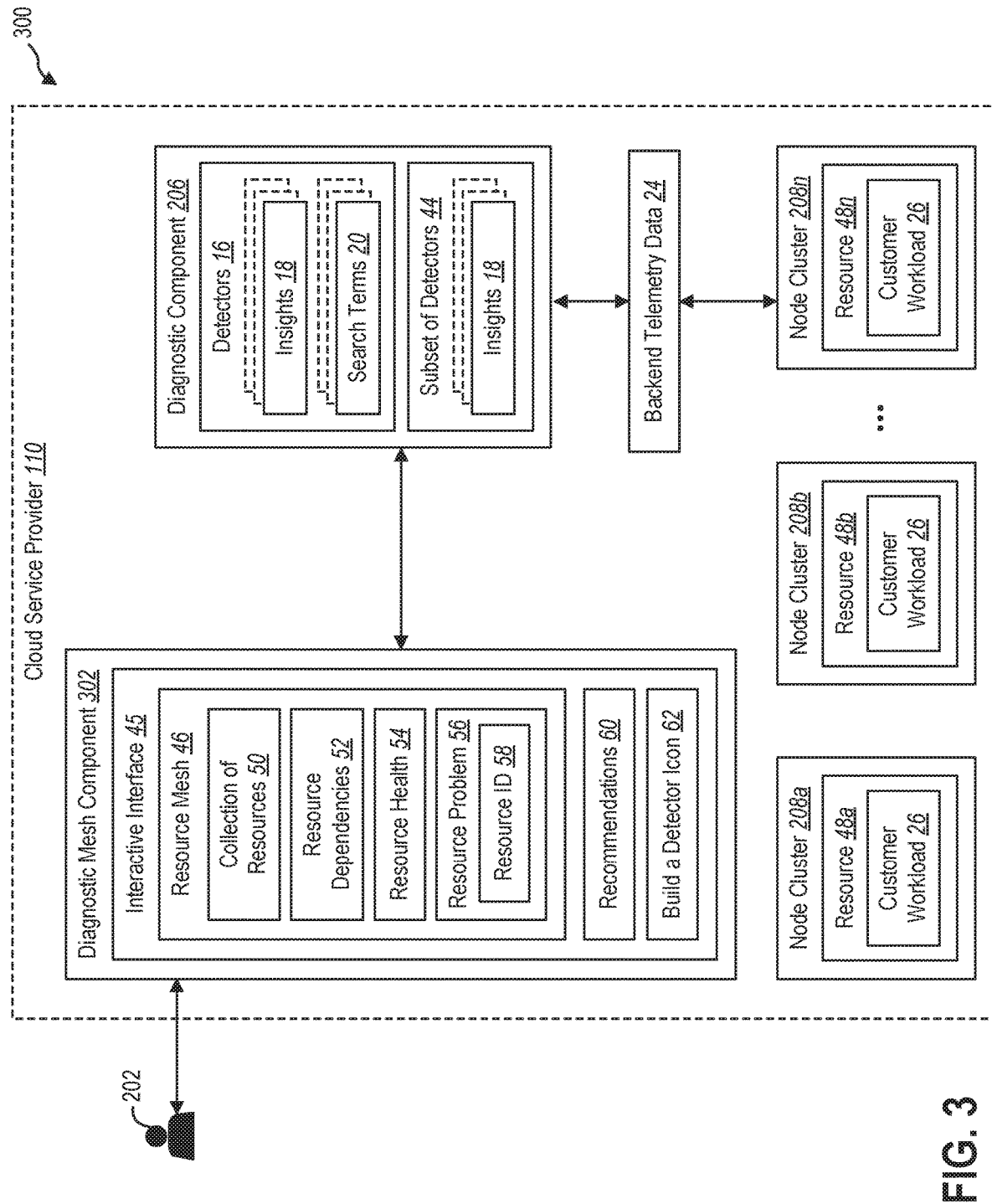
FIG. 3 illustrates an example environment for a diagnostic mesh component for use with a cloud service provider in accordance with an implementation of the present disclosure.

Referring now to FIG. 3, illustrated is an example environment 300 with a diagnostic mesh component 302 for use with a cloud service provider 110. The diagnostic mesh component 302 may be accessed by customers 202 of the cloud service provider 110, for example, through a portal for the cloud service provider 110 where the customers 202 may receive information about the different resources 48 the customers 202 are running on the cloud service provider 110. The customers 202 may rely on multiple services from the cloud service provider 110 and may run multiple resources 48a, 48b, 48n (up to n, where n is an integer) on the cloud service provider 110. Examples of the resources 48a, 48b, 48n may include, but are not limited to, Application Services, SQL databases, and/or storage accounts. Each resource 48a, 48b, 48n may include a customer workload 26. The dependency on multiple services, or a microservice architecture, versus one large service is a trend more and more customers 202 are embracing, which allows the customers 202 to isolate issues, decrease maintenance time, and/or scale quickly.

One or more resources 48a, 48b, 48n may be running on any number of node clusters 208a-n of the cloud service provider 110. Each resource 48a, 48b, 48n may include one or more customer workloads 26. The node clusters 208a-n may be grouped by geographic location (e.g., a region of node clusters). The node clusters 208a-n may also be implemented across multiple geographic locations (e.g., at different datacenters including one or multiple node clusters). Each of the node clusters 208a-n may include a variety of server nodes having a number and variety of compute cores thereon. In addition, one or more virtual machines may be implemented on the compute cores of the server nodes. Some or all the compute cores may include virtual machine(s) implemented thereon. The cloud service provider 110 may include multiple node clusters 208a-n.

One example may include a customer 202 using different resources 48 on the cloud service provider 110 for a small bakery shop. The different resources 48 may include application services, a blob storage account, and a SQL database. With the storage account, the customer 202 stores pastry images. The SQL database keeps track of the customer's 202 inventory and shoppers' information and the application services allows the customer 202 to launch their website and retrieve data from the storage account and the SQL database. When the SQL database or storage account goes down, the web application would also go down as it can no longer display its contents properly. To get everything back and running, previously, the customer 202 would have to look at the individual resources' diagnostic pages one at a time. With multiple resources, each relying on one another, getting to the root problem and remedying can easily become tedious and frustrating for the customer 202.

The customers 202 may use the diagnostic mesh component 302 to manage the resources 48a, 48b, 48n end-to-end. The diagnostic mesh component 302 may provide a centralized and simplified resource management system and error detection process that allows the customers 202 to troubleshoot a collection of resources 50, instead of focusing only on a single resource 48a, 48b, 48n individually. The customers 202 may use the diagnostic mesh component 302 for an overview of a collection of resources 50.

The diagnostic mesh component 302 may include an interactive interface 45 the customers 202 may access to view a resource mesh 46 for a collection of resources 50 the customers 202 is using on the cloud service provider 110. The collection of resources 50 may include all the resources 48a, 48b, 48n the customers is running on the cloud service provider 110. As such, the resource mesh 46 may visually represent the entire micro-services architecture from across different subscriptions for the customer 202. In addition, the collection of resources 50 may include a subset of the resources 48a, 48b, 48n the customer is running on the cloud service provider 110.

The resource mesh 46 may also illustrate resource dependencies 52 among the collection of resources 50. The different resources 48a, 48b, 48n may communicate with each other and/or depend on one another. The resources 48a, 48b, 48n may depend on a single resource or multiple resources. Moreover, the resources dependencies 52 may form a chain with multiple resources 48*a*, 48*b*, 48*n* depending on one another. The resource dependencies 52 for the collection of resources may become complicated depending on the number of resources 48*a*, 48*b*, 48*n* included in the collection of resources 50 and the types of dependencies for each resource 48*a*, 48*b*, 48*n*.

In one example, the resource mesh 46 may illustrate a graph of the collection of resources 50 with the resource dependencies 52 illustrated with a line between different resources. If one resource 48*a*, 48*b*, 48*n* goes down or has a problem, there may be issues in multiple resources 48*a*, 48*b*, 48*n* that depend on the resource that went down or has a problem. The graph may easily illustrate which resources 48*a*, 48*b*, 48*n* may be affected by the resources 48*a*, 48*b*, 48*n* that went down or has a problem.

The resource mesh 46 may also illustrate the resource health 54 for each of the resources 48*a*, 48*b*, 48*n* included in the collection of resources 50. The resource health 54 may indicate whether any of the resources 48*a*, 48*b*, 48*n* included in the collection of resources 50 are operating correctly. The resource health 54 may also indicate whether any of the resources 48*a*, 48*b*, 48*n* included in the collection of resources 50 have problems or issues impacting the operation of the resources 48*a*, 48*b*, 48*n*. The resource mesh 46 may allow customers to collaborate and share critical information about the resource health 54 of the collection of resources 50.

As such, the resource mesh 46 may provide the customers 202 with interactive visuals that quickly highlight unhealthy resources and may promote simple mitigation steps to fix or solve the problems. The resource mesh 46 may allow customers 202 to diagnose the customer workloads 26 for the collection of resources 50 with intuitive visuals to show resource dependencies 52, resource health 54, and find relevant next steps for fixing the customer workloads 26. In addition, the resource mesh 46 may provide early detection of potential issues and continuous best practices recommendations for the collection of resources 50.

One or more resource problems 56 identified by the resource health 50 may be sent to a diagnostic component 206. The diagnostic component 206 may automatically analyze which detectors 16 may be useful for troubleshooting the resource problems 56. The resource problems 56 may be associated with one or more resource IDs 58 that identify the individual resources 48*a*, 48*b*, 48*n* experiencing the resource problems 56. The diagnostic component 206 may identify a subset of detectors 44 to use for the resource problem 56. For example, the diagnostic component 206 may search a datastore 108 of detectors 16 to identify one or more detectors 16 with search terms 20 that match the identified resource problem 56. If one or more search terms 20 for a detector 16 matches the resource problem 56, the diagnostic component 206 may add the detector 16 to the subset of detectors 44. As such, the subset of detectors 44 may include a single detector 16 or a plurality of detectors 16.

The diagnostic component 206 may run the subset of detectors 44 on the backend telemetry data 24 for the customer workloads 26 for each resource 48*a*, 48*b*, 48*n* identified by the resource ID 58. The subset of detectors 44 may generate insights 18 based on the backend telemetry data 24 for the customer workloads 26. The diagnostic component 206 may send the insights 18 to the interactive interface 45 for presentation.

The interactive interface 45 may display the insights 18 received from the diagnostic component 206 for the customer 202 to view and/or analyze. The insights 18 may include one or more recommendations 60 for fixing or mitigating the resource problem 56. For example, the interactive interface 45 may display the recommendations 60 in a widget that is interactive and helps the user analyze from the most important issues relative to less important issues. The interactive interface 45 may also integrate documentation identified that may be helpful to the customer 202 in troubleshooting the resource problems 56. The recommendations 60 may give the customers 202 context on what to do next to fix or remedy the resource problem 56.

In an implementation, the recommendations 60 may be proactive notifications with best practices to follow by the customers 202 and/or may provide early detection of potential issues for the resources 48*a*, 48*b*, 48*n*. The diagnostic component 206 may automatically run one or more detectors 16 on the resources 48*a*, 48*b*, 48*n* to detect any anomalies on the resources 48*a*, 48*b*, 48*n* and may correlate any performance degradations of the resources 48*a*, 48*b*, 48*n* with the anomalies. The recommendations 60 may include next actions or steps the customer 202 may take to fix the detected anomalies and improve performance of the resources 48*a*, 48*b*, 48*n*. As such, the customers 202 may receive early detection of potential issues and may receive continuous best practices information for the resources 48*a*, 48*b*, 48*n*.

The interactive interface 45 may include a build a detector icon 62 that allows the customer 202 to build a new detector 16 if the customer 202 is unable to locate a detector 16 for the resource problem 56 or a detector 16 does not already exist for the resource problem 56. The customer 202 may select the build a detector icon 62 and the customer 202 may be guided through the steps of building a new detector 16, as discussed above in FIG. 1. The new detectors 16 may be available for use if the resource problem 56 occurs in the future. The new detectors 16 may be available for anyone to use within the organization for the customer 202.

One example use case may include a customer 202 has one website and two different databases running on the cloud service provider 110. The performance of one database may start to degrade. The customer 202 may use the build a detector icon 62 to build a custom detector 16 that provides a solution to switch from a main or primary database to a backup database if the performance of the main or primary database starts to degrade.

The customer 202 may leverage knowledge of the different resources 48*a*, 48*b*, 48*n* the customer 202 is running on the cloud service provider 110 to generate customized detectors 16 with solutions tailored to the customer 202. As such, the interactive interface 45 may allow the customers 202 to develop custom diagnostics based on the signals available to customize diagnostics according to the customer workloads 26.

Each of the components of the diagnostic mesh component 302 and/or the diagnostic component 206 may be in communication with each other using any suitable communication technologies. In addition, while the components of the diagnostic mesh component 302 and/or the diagnostic component 206 are shown to be separate, any of the components or subcomponents may be combined into fewer components, such as into a single component, or divided into more components as may serve a particular implementation. As an illustrative example, the components may be implemented on different server devices of the cloud service provider 110. As another illustrative example, one or more of the components may be implemented on an edge computing device that is not implemented on the hierarchy of devices of the cloud service provider 110.

Moreover, the components of the diagnostic mesh component 302 and/or the diagnostic component 206 may include hardware, software, or both. For example, the components of the diagnostic mesh component 302 and/or the diagnostic component 206 may include one or more instructions stored on a computer-readable storage medium and executable by processors of one or more computing devices. When executed by the one or more processors, the computer-executable instructions of one or more computing devices can perform one or more methods described herein. Alternatively, the components of the diagnostic mesh component 302 and/or the diagnostic component 206 may include hardware, such as a special purpose processing device to perform a certain function or group of functions. Additionally, or alternatively, the components of the diagnostic mesh component 302 and/or the diagnostic component 206 may include a combination of computer-executable instructions and hardware.

The diagnostic mesh component 302 may simplify the management of an entire production workload by being the all-in-one platform where the customers 202 may diagnose, monitor, and manage their resources 48a, 48b, 48n end-to-end. The diagnostic mesh component 302 may provide the customers 202 with up to date health and availability metrics of all of the customers' 202 resources 48a, 48b, 48n so that the customers 202 may quickly mitigate production issues and keep the customer workloads 26 online.

The diagnostic mesh component 302 may visually provide the connections between the different resources 48a, 48b, 48n. In addition, the diagnostic mesh component 302 may provide the customers 202 the ability to dive deeper into a specific resource 48a, 48b, 48n to obtain other relevant details and receive actionable next steps both to prevent and/or resolve issues with the resources 48a, 48b, 48n. As such, the customer 202 may save time by quickly identifying unhealthy resources 48a, 48b, 48n and any dependencies on the unhealthy resources 48a, 48b, 48n and actionable next steps to resolve the problems with the unhealthy resources 48a, 48b, 48n.

The diagnostic mesh component 302 may provide the customers 202 with intelligent recommendations that provide early detection of potential issues and provide customers 202 with continuous best practices information to ensure that the customer workloads 26 are running healthy. Given that the customers 202 rely on a microservice architecture on the cloud service provider 110, the diagnostic mesh component 302 may make using multiple resources 48a, 48b, 48n a seamless and visually pleasing experience for the customers 202.

Figure 4:
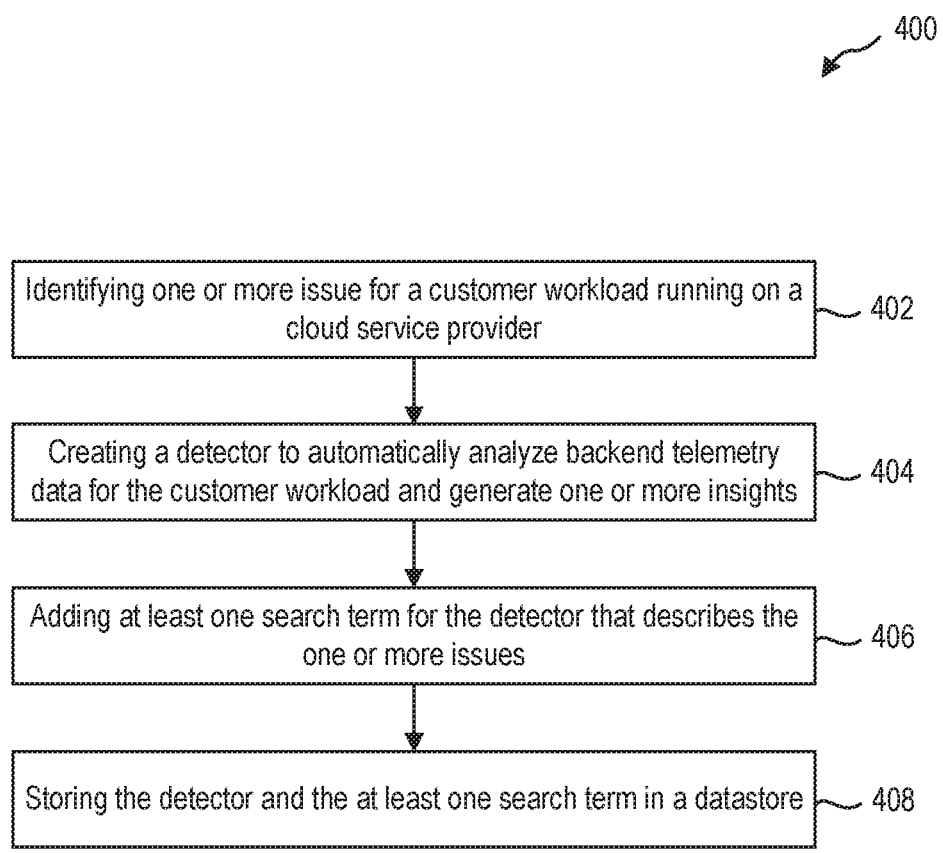
FIG. 4 illustrates an example method for building a detector in accordance with an implementation of the present disclosure.

Referring now to FIG. 4, an example method 400 may be used by the detector platform 106 (FIG. 1) to build one or more detectors 16 (FIG. 1) for use with troubleshooting customer workloads 26 (FIG. 1) running on the cloud service provider 110 (FIG. 1). The detector platform 106 may include a detector building component 14 that may implement one or more actions of method 400. The actions of method 400 may be discussed below with reference to the architecture of FIG. 1.

At 402, method 400 may include identifying one or more issues for a customer workload running on a cloud service provider. A user 102, such as, a customer support engineer for the cloud service provider 110, may access a user interface 22 that will guide and/or aid the users 102 in building detectors 16. Examples of the user interface 22 may include, but are not limited to, an online code editor or a local development package. The user 102 may provide a query 10 to the user interface 22 that explains the one or more issues 12 related to the customer workload 26. The one or more issues 12 may include any problems or anything that may be preventing the customer workload 26 from operating correctly. For example, the user 102 may observe the one or more issues 12 of the customer workload 26, the user may receive an error or warning regarding the one or more issues 12, and/or the user 102 may receive information from a customer describing the one or more issues 12.

At 404, method 400 may include creating a detector to automatically analyze backend telemetry data for the customer workload and generate one or more insights. The detector building component 14 may identify the backend telemetry data 24 associated with the customer workload 26. The backend telemetry data 24 may include all the information that may be required to troubleshoot the issues 12 or symptoms with the customer workload 26. The backend telemetry data 24 may include specific information relating to the cloud service provider 110 and/or information relating to one or more components of the customer workload 26.

The detector building component 14 may generate one or more insights 18 for the detector 16. Insights 18 may provide the users 102 an observation with a summary of the issues 12 and one or more recommended actions that the users 102 may take to fix the issues 12. Each insight 18 may expand to provide a description to further explain what the insight 18 found in the backend telemetry data 24. A description may be necessary to expand on the issue 12 and explain to the users 102 why the issue 12 is occurring. The descriptions may provide different rendering types that allows the users 102 to easily visualize the reason why the issue 12 is occurring.

Each insight 18 may also include one or more recommended actions. The recommended actions may detail the next steps for the users 102 to take to mitigate or fix the issue 12. The recommended actions may be dynamically generated by the detector 16 and may include document integration.

The appropriate insights 18 may be generated by the detector 16 to point out to the users 102 the cause of the issue 12 based on the backend telemetry data 24 that is returned for the customer workload 26. Each detector 16 may address one or more issues 12 by automatically running and surfacing the appropriate backend telemetry data 24 in an understandable and customer-friendly way. As such, the insights 18 may provide rich diagnostics and/or quick mitigations that provide interactive visuals with contextual information to recommend mitigation solutions for the issue 12.

At 406, method 400 may include adding at least one search term for the detector that describes the one or more issues. The user interface 22 may prompt the users 102 to enter one or more search terms 20 that include key words or phrases that describe the detector 16 and/or the issues 12 the detector 16 addresses. As such, the search terms 20 may allow discovery of the different detectors 16 by the users 102 using free-flowing language to describe an issue 12 or problem with a customer workload 26.

At 408, method 400 may include storing the detector and the at least one search term in a datastore. A datastore 108 in communication with the detector platform 106 may store the one or more detectors 16 once the detectors 16 are created. The datastore 108 may be accessed by internal troubleshooting experiences, such as, customer support engineers aiding a customer in solving one or more issues 12 with the customer workloads 26. In addition, the datastore 108 may be accessed by external facing experiences, such as, customer troubleshooting experiences so that customers may take advantage of the self-serve diagnostics experience provided by the detectors 16. The detectors 16 may surface up in multiple frontends, allowing for better developer effectiveness and efficiency in writing supportability tooling.

As such, method 400 may be used to build a detector 16 once and leverage the detector 16 in a plurality of self-service troubleshooting and/or diagnostic experiences for the cloud service provider 110. The detectors 16 may aid users in self-diagnostics by automatically running and surfacing appropriate backend telemetry data 24 for the customer workload 26 and providing insights 18 to point out the cause of the issue 12 and/or provide next steps to fix the issue in an easy and understandable manner.

Figure 5:
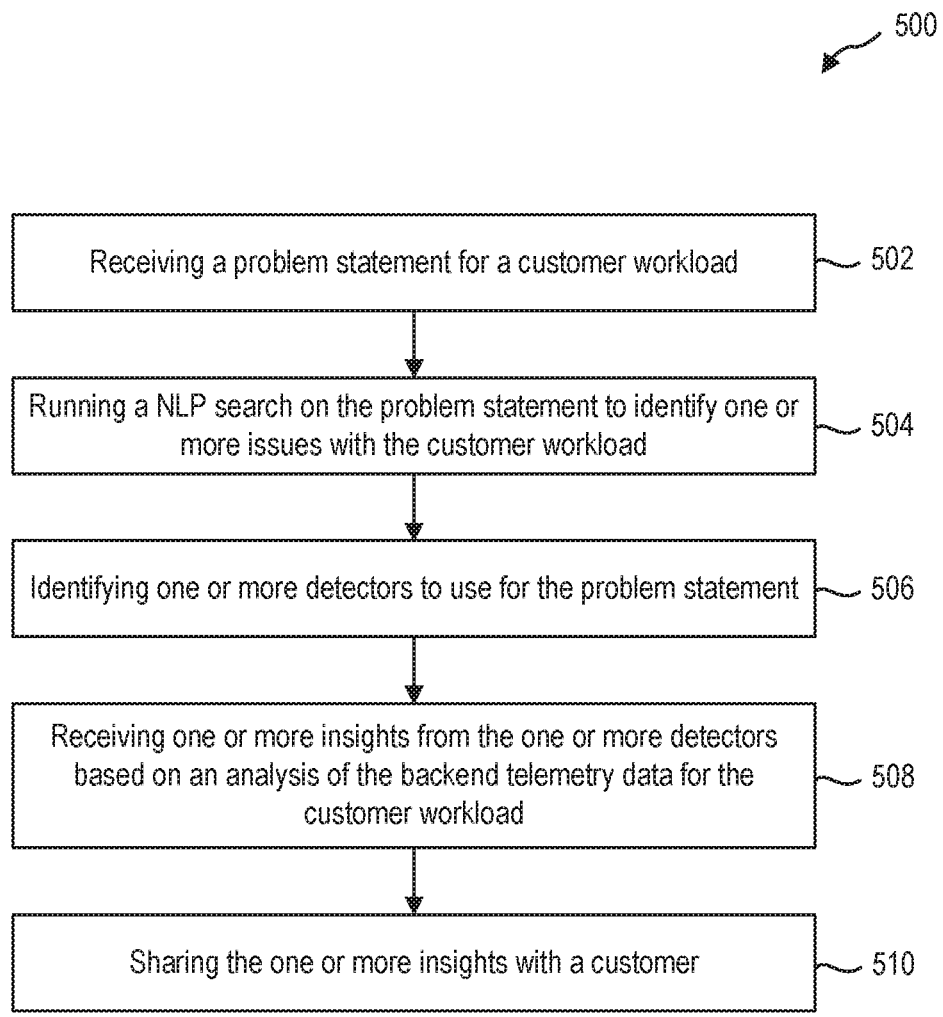
FIG. 5 illustrates an example method for using a detector in accordance with an implementation of the present disclosure.

Referring now to FIG. 5, an example method 500 may be used by the detector platform 106 (FIG. 1) to use one or more detectors 16 (FIG. 1) for troubleshooting customer workloads 26 (FIG. 1) running on the cloud service provider 110 (FIG. 1). The detector platform 106 may include a customer support component 29 that may implement one or more actions of method 400. The customer support component 29 may be an intelligent diagnostics recommendation system that uses NLP searches 31 to show relevant diagnostics and/or documents to the users 102 based on a problem description provided by a customer. The actions of method 500 may be discussed below with reference to the architecture of FIG. 1.

At 502, method 500 may include receiving a problem statement for a customer workload. A user 102, such as, a customer support engineer for the cloud service provider 110, may receive a problem description provided by a customer for a customer workload 26. For example, the customer may call or otherwise contact the user 102 for help or support in solving the problem for the customer workload 26. The user 102 may enter in a query 10 to the user interface 22 with a description of one or more issues 12 or problems occurring with the customer workload 26.

At 504, method 500 may include running an NLP search on the problem statement to identify one or more issues with the customer workload. The user 102 may enter in a query 10 to the user interface with a description of one or more issues 12 or problems occurring with the customer workload 26. The query 10 may use natural language to describe the issues 12. The customer support component 29 may run NLP searches 31 on the query 10 to identify the issues 12 described in the query 10.

At 506, method 500 may include identifying one or more detectors to use for the problem statement. The customer support component 29 may perform a search in the datastore 108 for one or more detectors 16 with search terms 20 that correspond to the identified issues 12. The customer support component 29 may automatically identify and/or select which detectors 16 to use in response to the problem the customer described for the customer workload 26.

In another implementation, the user 102 may select one or more detectors 16 to solve the issue 12 by navigating through different categories of the detectors 16 based on the problem description provided by the customer. The detectors 16 may be grouped into different categories using the search terms 20 associated with the detectors 16. The different categories may be created in response to common problems occurring in the customer workloads 26. As such, the users 102 may use the categories to quickly navigate to one or more detectors 16 to use for the problem description provided by the customer.

At 508, method 500 may include receiving one or more insights from the one or more detectors based on an analysis of the backend telemetry data for the customer workload. The one or more detectors 16 may automatically access the backend telemetry data 24 for the customer workload 26 and may check the resources. The one or more detectors 16 may provide one or more insights 18 with observations of what the detectors 16 observed in the backend telemetry data 24 and the detectors 16 may provide one or more recommended actions for recovering from the issues 12 and/or for fixing the issues 12. The insights 18 may provide the users 102 an observation with a summary of the issues 12 and one or more recommended actions that the users 102 may take to fix the issues 12. Each insight 18 may expand to provide a description to further explain what the insight 18 found in the backend telemetry data 24.

The insights 18 may intelligently recommend diagnostics based on the context of the backend telemetry data 24 for the customer workload 26 by explaining the issues 12 and providing steps or actions for fixing the issues 12. As such, the insights 18 may investigate the data of the backend telemetry data 24 and provide rich diagnostics and/or quick mitigations that provide interactive visuals with contextual information based on the backend telemetry data 24.

At 510, method 500 may include sharing the one or more insights with a customer. The customer support component 29 may have an icon 32, such as a button, the user 102 may select to share the insights 18 received from the detectors 16 with the customer. The customer may immediately be able to view the charts and/or diagrams with the explanation of the cause of the issues 12 and the recommended next steps for remedying the issues 12. The user 102 may be able to share the insights 18 while communicating with the customer to provide the customer with contextual information about the cause of the issues 12 with easy to understand graphs and/or charts that allows the customer to visualize the data and understand the recommended solutions to fix the issues 12.

As such, method 500 may be used to convert queries 10 with a generic context and/or issues 12 for a customer workload 26 into user-friendly user experience with actionable insights and next steps to fix the issues 12 for the customer workload 26.

Figure 6:
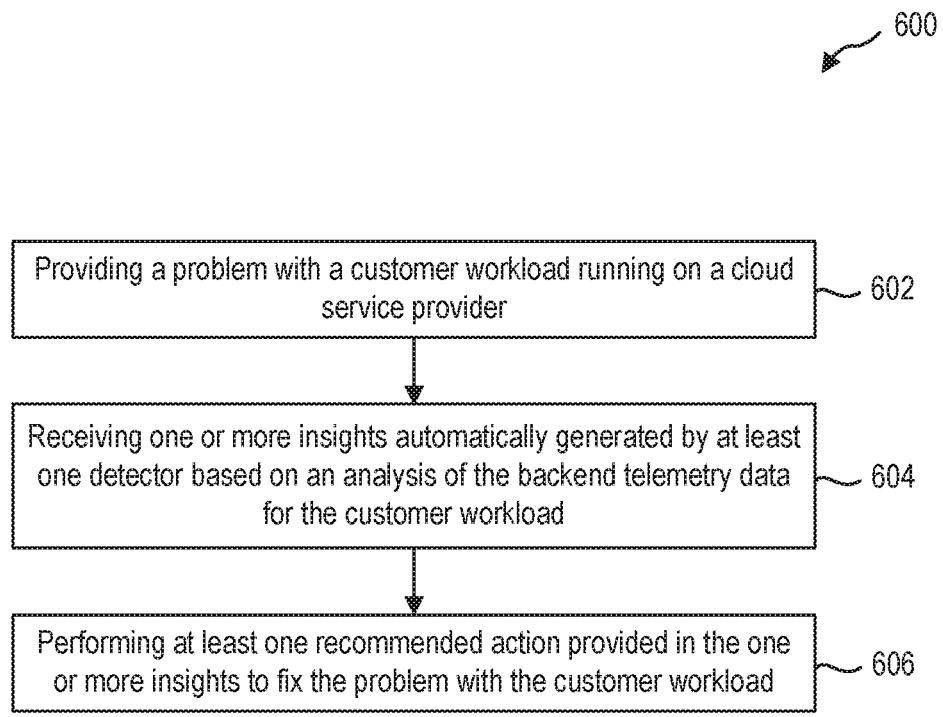
FIG. 6 illustrates an example method for using an interactive interface to self-diagnose problems with a customer workload running on a cloud service provider in accordance with an implementation of the present disclosure.

Referring now to FIG. 6, an example method 600 may performed by a self-diagnostic component 204 to aid a customer 202 (FIG. 2) in self-diagnosing problems with a customer workload 26 (FIG. 2) running on a cloud service provider 110 (FIG. 2). The self-diagnostic component 204 may include an interactive interface 28 the customer 202 may use in troubleshooting or solving a problem with a customer workload 26. In an implementation, the interactive interface 28 may be a chatbot-like experience that simulates how a customer support engineer would guide a customer through the problem, observations, and the suggested solutions. The interactive interface 28 may combine part of a chatbot while infusing text, visual cues, charts, and/or actionable next steps that gives the customers 202 a guided experience and gives context to the data relating to the customer workload 26. The actions of method 600 may be discussed below with reference to the architecture of FIG. 2.

At 602, method 600 may include providing a problem with a customer workload running on a cloud service provider. The customer 202 may use the interactive interface 28 to enter in a problem 30 they are facing with one or more customer workloads 26. The problem 30 may include different words or phrases that describe what is wrong with the customer workload 26 or what might be occurring with the customer workload 26. The problem 30 may also provide a customer workload identification (ID) 33 to identify which customer workload 26 is experiencing the problem 30.

At 604, method 600 may include receiving one or more insights automatically generated by at least one detector based on an analysis of the backend telemetry data for the customer workload. The interactive interface 28 may perform an NLP search 34 on the problem 30 provided by the customer 202 using a NLP search engine. The NLP search 34 may identify one or more key words or issues 12 that the customer 202 is experiencing with the customer workload 26. The interactive interface 28 may send the identified issues 12 and/or key words, along with the customer workload ID 33 to a diagnostic component 206.

The diagnostic component 206 automatically analyzes which detectors 16 may be useful for the problem 30 and identify a subset of detectors 44 to use for the problem 30. For example, the diagnostic component 206 may search a datastore 108 of detectors 16 to identify one or more detectors 16 with search terms 20 that match the identified keywords or issues 12. If one or more search terms 20 for a detector 16 matches the identified keywords or issues 12, the diagnostic component 206 may add the detector 16 to the subset of detectors 44. As such, the subset of detectors 44 may include a single detector 16 or a plurality of detectors 16.

In another implementation, the customer 202 may search through a listing of detectors 16 with descriptions for the detectors 16. The customer 202 may select the subset of detectors 44 to use for the problem 30. For example, the customer 202 may select different detectors 16 to include in the subset of detectors 44 based on the key words or phrases used to describe the issues 12 that the detectors 16 address or solve. The customers 202 may easily search for favorite detectors 16 and detector discovery is easier with the more relevant detectors 16 highlighted upfront.

The interactive interface 28 may display the insights 18 received from the diagnostic component 206 for the customer 202 to view and/or analyze. For example, the interactive interface 28 may display the insights 18 in a widget that is interactive and helps the user analyze from the most important issues relative to less important issues. The interactive interface 28 may also integrate documentation identified that may be helpful to the customer 202 in the insights 18. The interactive interface 28 may break down the information provided in the insights 18 into observations and recommended actions to give the customers 202 context on what to do next to fix or remedy the problem 30. As such, the insights 18 provided by the subset of detectors 44 may be embedded into the interactive, guided user experience that the self-diagnostic component 204 offers the customers 202.

At 606, method 600 may include performing at least one recommended action provided in the one or more insights to fix the problem with the customer workload. The interactive interface 28 may also provide an icon 36 the customer 202 may to select to automatically fix the problem 30. For example, the icon 36 may be a button with a label "Fix It" that the customer 202 may select. Upon the customer 202 selecting the icon 36, the interactive interface 28 may communicate with the diagnostic component 206 to automatically implement one or more of the recommended next steps or actions provided in the insights 18 to fix or otherwise remedy the problem 30 with the customer workload 26.

Method 600 may optionally include providing one or more recommendations the customer may take to improve the customer workloads or help keep the customer workloads 26 resilient to issues that may prevent the customer workloads 26 from operating effectively. The recommendations 38 may include proactive best practices the customer 202 may implement for the customer workloads 26.

Method 600 may optionally include establishing proactive tooling to automatically run on the customer workloads and/or customer resources on the cloud service provider to identify when the customer workloads and/or customer resources may have a problem or issue. The interactive interface 28 may allow the customer 202 to establish proactive tooling 40 to automatically run on the customer workloads 26 and/or customer resources. Upon the customer resource and/or the customer workload 26 reaching or exceeding a predefined threshold 42, the proactive tooling 40 may take steps or mitigative actions to automatically fix the problem or issue 12 and/or provide information to further trouble shoot the problem or issue 12.

As such, method 600 may provide the customers 202 interactive troubleshooting by using the interactive interface 28 to guide the customers 202 through a troubleshooting journey. Method 600 may provide the customers 202 guided and interactive experiences powered by intelligent NLP-search capabilities and may set up proactive auto-heal capabilities for the customer workloads 26.

Figure 7:
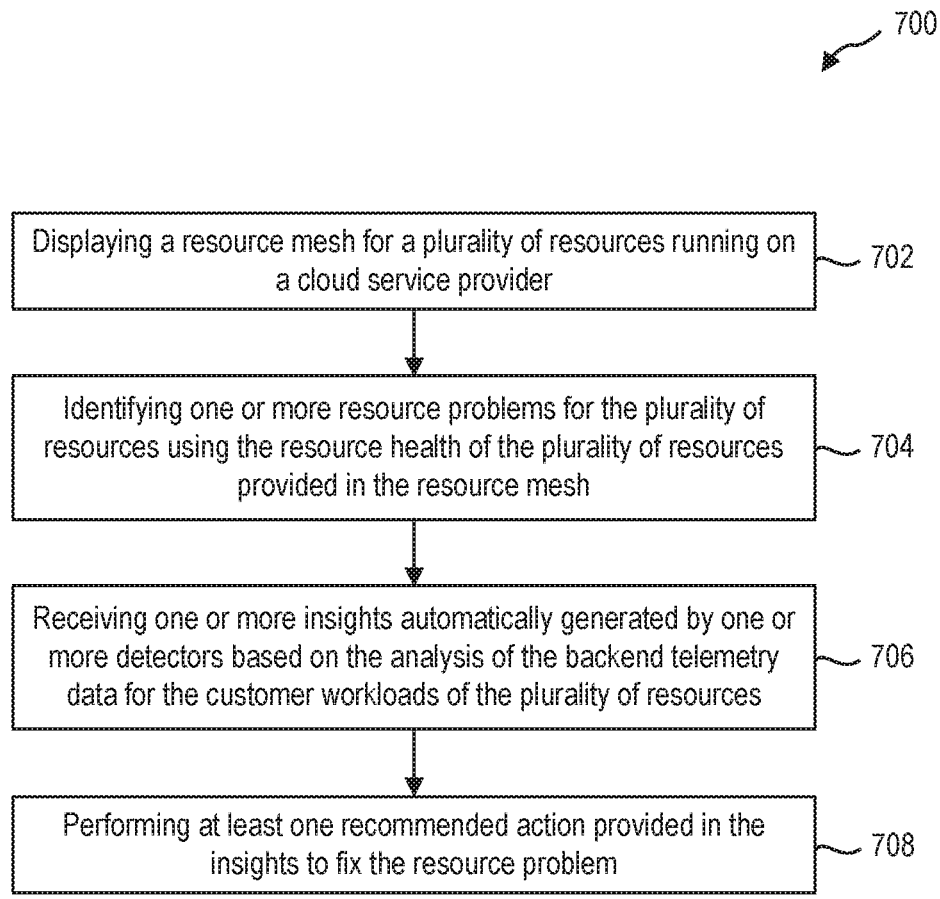
FIG. 7 illustrates an example method for using a resource mesh to self-diagnose problems with resources running on a cloud service provider in accordance with an implementation of the present disclosure.

Referring now to FIG. 7, an example method 700 may be used by a diagnostic mesh component 302 (FIG. 3) for self-diagnosing problems with resources 48*a*, 48*b*, 48*n* (FIG. 3) running on the cloud service provider 110 (FIG. 1). The diagnostic mesh component 302 may include an interactive interface 45 (FIG. 3) that may implement one or more actions of method 700. The actions of method 700 may be discussed below with reference to the architecture of FIG. 3.

At 702, method 700 may include displaying a resource mesh for a plurality of resources running on a cloud service provider. An interactive interface 45 may display a resource mesh 46 for a collection of resources 50 the customers 202 are using on the cloud service provider 110. The collection of resources 50 may include all the resources 48*a*, 48*b*, 48*n* the customers is running on the cloud service provider 110. In addition, the collection of resources 50 may include a subset of the resources 48*a*, 48*b*, 48*n* the customer is running on the cloud service provider 110. As such, the resource mesh 46 may visually represent the entire micro-services architecture from across different subscriptions for the customer 202.

The resource mesh 46 may also illustrate resource dependencies 52 among the collection of resources 50. In one example, the resource mesh 46 may illustrate a graph of the collection of resources 50 with the resource dependencies 52 illustrated with a line between different resources. If one resource 48*a*, 48*b*, 48*n* goes down or has a problem, there may be issues in multiple resources 48*a*, 48*b*, 48*n* that depend on the resource that went down or has a problem. The graph may easily illustrate which resources 48*a*, 48*b*, 48*n* may be affected by the resources 48*a*, 48*b*, 48*n* that went down or has a problem.

At 704, method 700 may include identifying one or more resource problems for the plurality of resources using the resource health of the plurality of resources provided in the resource mesh. The resource mesh 46 may also illustrate the resource health 54 for each of the resources 48*a*, 48*b*, 48*n* included in the collection of resources 50. The resource health 54 may indicate whether any of the resources 48*a*, 48*b*, 48*n* included in the collection of resources 50 are operating correctly. The resource health 54 may also indicate whether any of the resources 48*a*, 48*b*, 48*n* included in the collection of resources 50 have problems or issues impacting the operation of the resources 48*a*, 48*b*, 48*n*. The resource mesh 46 may allow customers to collaborate and share critical information about the resource health 54 of the collection of resources 50.

The resource mesh 46 may provide the customers 202 with interactive visuals that quickly highlight unhealthy resources and promotes simple mitigation steps to fix or solve the problems. The resource mesh 46 may allow customers 202 to diagnose the customer workloads 26 for the collection of resources 50 with intuitive visuals to show resource dependencies 52, resource health 54, and find relevant next steps for fixing the customer workloads 26. In addition, the resource mesh 46 may provide early detection of potential issues and continuous best practices recommendations for the collection of resources 50.

At 706, method 700 may include receiving one or more insights automatically generated by one or more detectors based on the analysis of the backend telemetry data for the customer workloads of the plurality of resources. One or more resource problems 56 identified by the resource health 50 may be sent to a diagnostic component 206 that may automatically analyze which detectors 16 may be useful for the resource problems 56. The resource problem(s) 56 may be associated with one or more resource IDs 58 that identify the individual resource(s) 48a, 48b, 48n experiencing the resource problem(s) 56. The diagnostic component 206 may identify a subset of detectors 44 to use for the resource problem 56. For example, the diagnostic component 206 may search a datastore 108 of detectors 16 to identify one or more detectors 16 with search terms 20 that match the identified resource problem 56 and may add the one or more detectors 16 to the subset of detectors 44 when a match occurs. The subset of detectors 44 may include a single detector 16 or a plurality of detectors 16.

The diagnostic component 206 may run the subset of detectors 44 on the backend telemetry data 24 for the customer workloads 26 for each resource 48a, 48b, 48n identified by the resource ID 58. The subset of detectors 44 may generate insights 18 based on the backend telemetry data 24 for the customer workloads 26. The diagnostic component 206 may send the insights 18 to the interactive interface 45 for presentation.

The interactive interface 45 may display the insights 18 with one or more recommendations 60 with recommended actions to fix or mitigate the resource problem 56. For example, the interactive interface 45 may display the recommendations 60 in a widget that is interactive and helps the user analyze from the most important issues relative to less important issues. The interactive interface 45 may also integrate documentation identified that may be helpful to the customer 202 in troubleshooting the resource problems 56. The recommendations 60 may give the customers 202 context on what to do next to fix or remedy the resource problem 56. In an implementation, the recommendations 60 may be proactive notifications with best practices to follow by the customers 202 and/or may provide early detection of potential issues for the resources 48a, 48b, 48n.

At 708, method 700 may include performing at least one recommended action provided in the insights to fix the resource problems. The customer 202 may use the diagnostic mesh component 302 to perform one or more recommended actions provided in the insights to fix or mitigate the resource problems 56.

Method 700 may optionally facilitate building of new detectors. The interactive interface 45 may allow the customers 202 to develop custom diagnostics based on the signals available to customize diagnostics performed by the new detectors 16 according to the customer workloads 26.

The customer 202 may select the build a detector icon 62 on the interactive interface 45 and the customer 202 may be guided through the steps of building a new detector 16. The new detectors 16 may be available for use if the resource problem 56 occurs in the future.

Method 700 may save the customer 202 time by quickly identifying unhealthy resources 48a, 48b, 48n and any dependencies on the unhealthy resources 48a, 48b, 48n and providing actionable next steps to resolve the problems with the unhealthy resources 48a, 48b, 48n. As such, method 700 may be used to manage a plurality of resources end-to-end.

Figure 8:
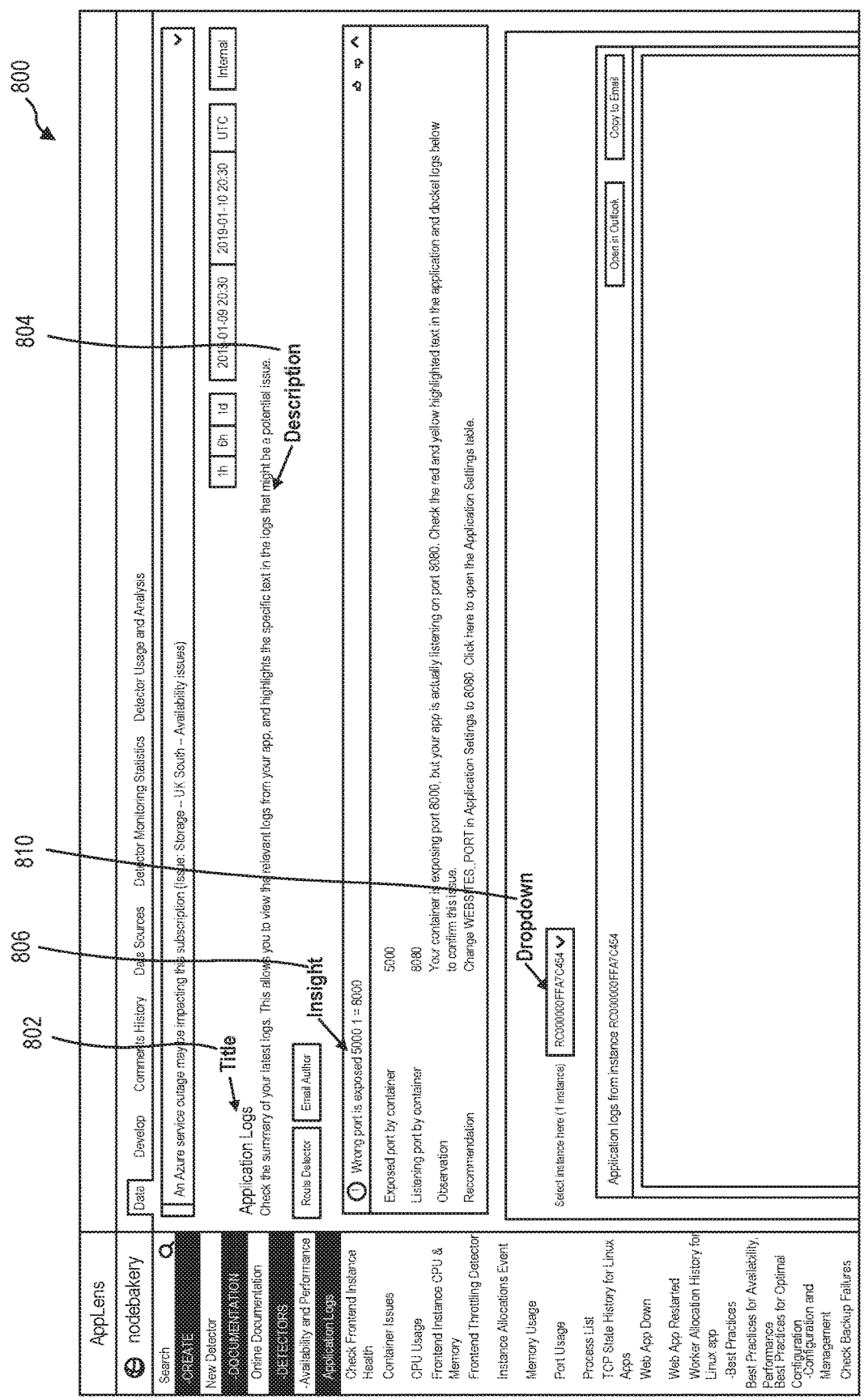
FIG. 8 illustrates an example user interface screen illustrating an example detector in accordance with an implementation of the present disclosure.

Referring now to FIG. 8, illustrated is an example user interface screen 800 that illustrates an example detector 16 (FIG. 1) for use with a detector building component 14 (FIG. 1) and/or a customer support component 29 (FIG. 1). The user interface screen 800 may be displayed using user interface 22 (FIG. 1). The detector 16 may be built by a user 102 (FIG. 1) to address one or more issues 12 (FIG. 1) relating to a customer workload 26 (FIG. 1).

The user interface screen 800 may include a title 802 "Application Logs" for the detector 16. The user interface screen 800 may also include a description 804. The description 804 may reflect the customer symptoms and/or problems that may be occurring in the customer workloads 26. The user interface screen 800 may also include insights 806. Each detector 16 includes at least one insight 806, which may be expandable. Insights 806 may include, for example, tables and/or graphs to summarize information and/or data. The user interface screen 800 may also include a dropdown 810. The dropdown 810 allows the data to format in a specific way. For example, the dropdown 810 may select one parameter that the data pivots on, such as, an instance name or a function name.

A user 102 and/or a customer 202 may use the information provided in the title 802 and/or the description 804 to understand the issues the detector 16 is trying to resolve. A user 102 and/or a customer 202 may also use the insights 806, and/or the dropdown 810 to easily view and understand the backend telemetry data 24 (FIG. 1) that the detector 16 analyzed for the customer workloads 26.

Figure 9:
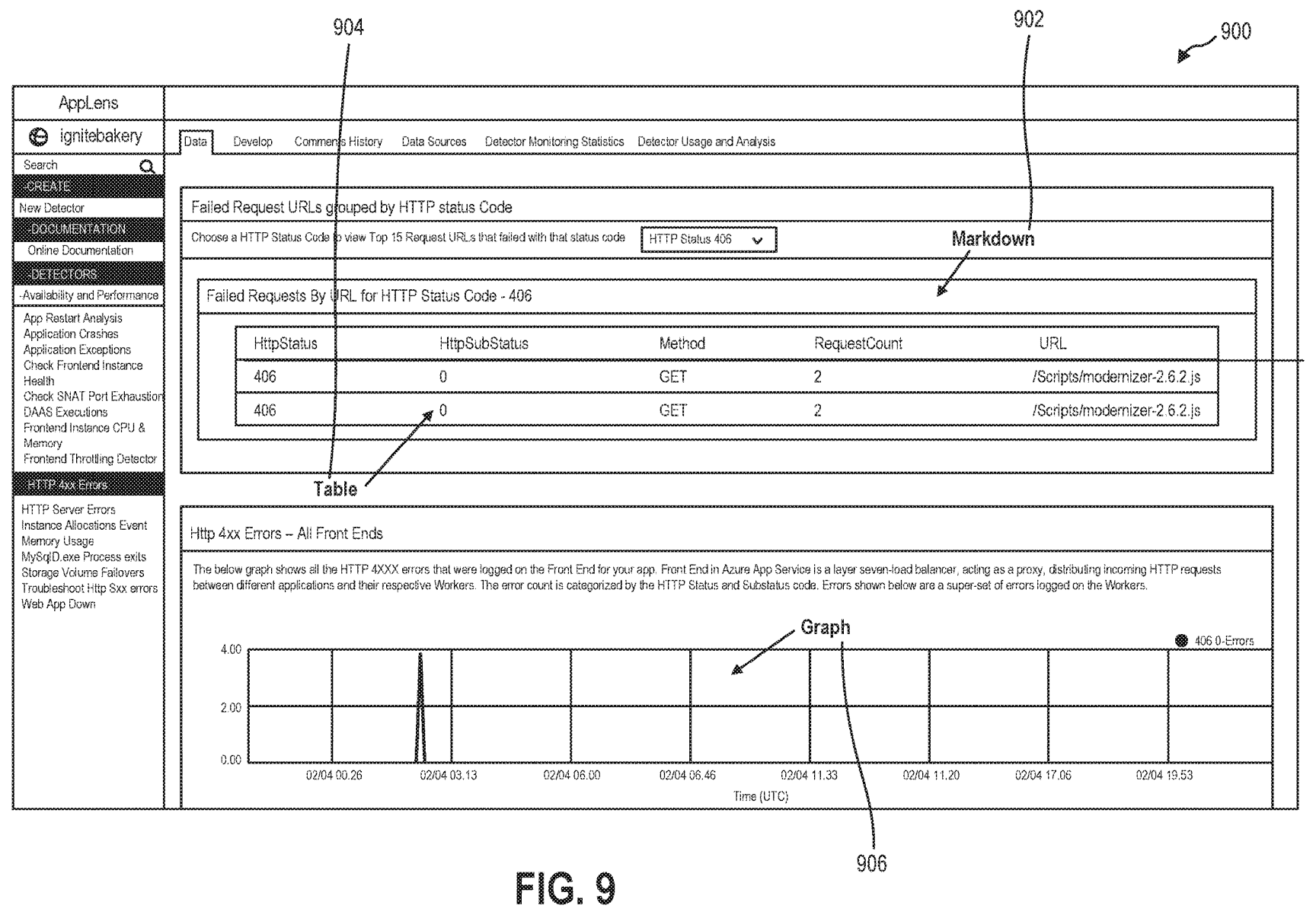

Referring now to FIG. 9, illustrated is an example user interface screen 900 that illustrates an example detector 16 (FIG. 1) for use with a detector building component 14 (FIG. 1) and/or a customer support component 29 (FIG. 1). The user interface screen 900 may be displayed using user interface 22 (FIG. 1). The detector 16 may be built by a user 102 (FIG. 1) to solve one or more issues 12 (FIG. 1) relating to a customer workload 26 (FIG. 1).

The user interface screen 900 may include a markdown 902. The markdown 902 may convey additional information to the customer 202. For example, the markdown 902 may be used to further educate the customer 202 about a particular issue or educate the customer 202 on the detector 16. The user interface screen 900 may also include a table 904 summarizing the information included in the markdown 902. In addition, the user interface screen 900 may include a graph 906 illustrating the HTTP errors observed by the detector 16 in the backend telemetry data 24 (FIG. 1) analyzed for the customer workloads 26.

A user 102 and/or a customer 202 may use the information provided in the markdown 902, the table 904, and/or the graph 906 to easily view and understand the backend telemetry data 24 (FIG. 1) that the detector 16 analyzed for the customer workloads 26.

Figure 10:
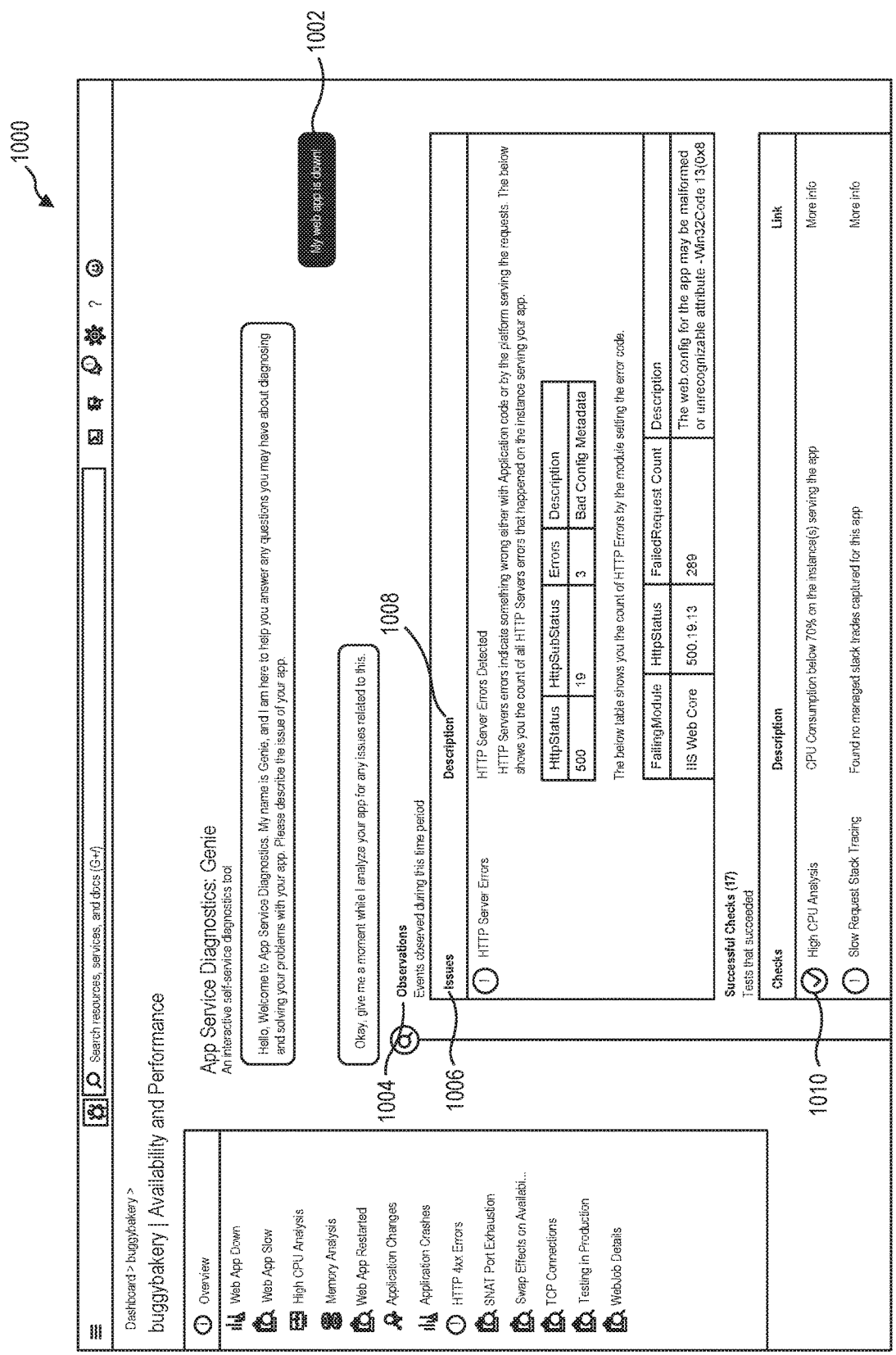
FIG. 10 illustrates an example interactive interface in accordance with an implementation of present disclosure.

Referring now to FIG. 10, illustrated is an example interactive interface 1000. The interactive interface 1000 may receive an input 1002 describing a problem 30 (FIG. 2)

with a customer workload 26 (FIG. 2). For example, the problem 30 may be the customers' web application is down. The interactive interface 1000 may display observations 1004 provided automatically by one or more detectors 16 (FIG. 1) after analyzing the backend telemetry data 24 for the customer workload 26.

The observations 1004 may include the issues 1006 observed in the backend telemetry data 24 by the detector 16 and a description 1008 of why the issues 1006 are occurring in the customer workload 26. The descriptions 1008 may include tables summarizing the information analyzed in the backend telemetry data 24.

The interactive interface 1000 may also include successful checks 1010 performed by the detector 16. The successful checks 1010 may indicate the areas of the customer workload 26 that are operating correctly or successfully based on the information analyzed in the backend telemetry data 24 by the detector 16.

As such, the interactive interface 1000 may provide a chatbot-like experience that simulates how a customer support engineer would guide the customer 202 through the problem, observations, and the suggested solutions. The interactive interface 1000 may combine part of a chatbot while providing text, visual cues, charts, and/or actionable next steps that gives the customer 202 a guided experience and gives context to the data relating to the customer workload 26 so that the customer 202 may self-diagnose and troubleshoot a problem 30 of a customer workload 26 on their own.

Figure 11:
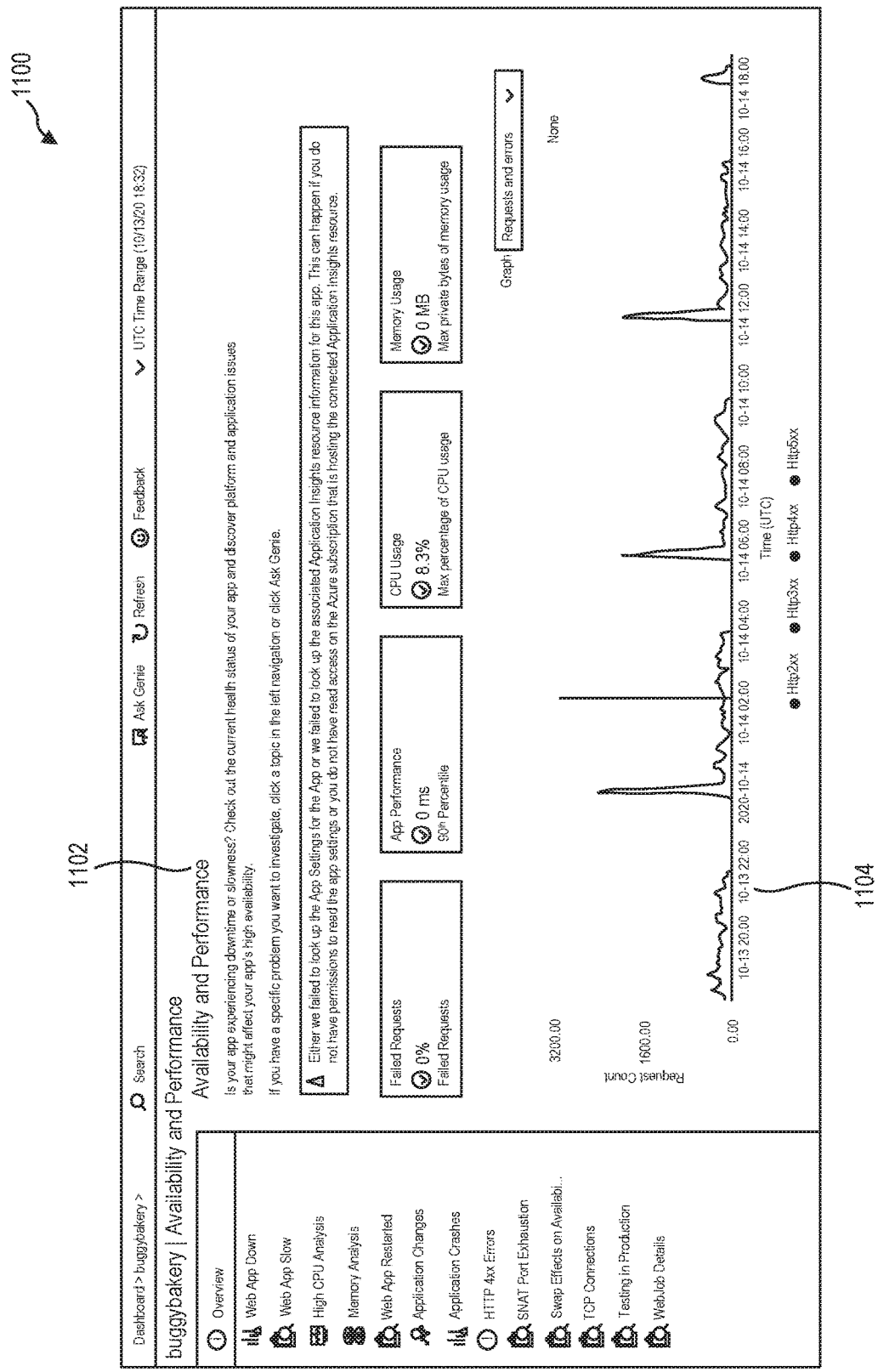
FIG. 11 illustrates an example user interface screen for use with an interactive interface in accordance with an implementation of the present disclosure.

Referring now to FIG. 11, illustrated is an example user interface screen 1100 for use with an interactive interface 28 (FIG. 2). The user interface screen 1100 may include an availability and performance 1102 of a customer workload 26. A graph 1104 may be presented illustrating the backend telemetry data 24 for the customer workload 26 automatically observed by one or more detectors 16. For example, the detectors 16 may have run potential checks on the customer workload 26 and may have generated a graph 1104 with recommendations 38 for keeping the downtime for the customer workload 26 low and/or keeping the customer workload 26 resilient to issues that may prevent the customer workload from operating correctly.

The graph 1104 may be used by a customer 202 to easily view one or more recommendations for areas of improvements the customer 202 may make to ensure the customer workload 26 are healthy and resilient to downtimes. As such, the graph 1104 may aid the customer 202 in maintaining healthy customer workloads 26 on the cloud service provider 110.

Referring now to FIG. 12, illustrated is an example user interface screen 1200 for use with an interactive interface 28 (FIG. 2). The user interface screen 1200 may include list of areas one or more detectors 16 analyzed in the customer workload 26 and an indication whether the areas are operating correctly or may have one or more problems. For example, the detectors 16 may have run potential checks on different areas of the customer workload 26 and may have generated the list of the areas based on the analysis of the backend telemetry data 24 by the one or more detectors 16.

The list may include one or more healthy areas 1202, 1206, where the identified areas of the customer workload 26 are operating correctly. In addition, the list may include one or more unhealthy areas 1204 where a problem or issue may have been identified in the customer workload 26 by the detectors 16 based on the analysis of the backend telemetry data 24.

The list may be used by a customer 202 to easily view one or more areas that may need to be fixed (e.g., the unhealthy areas 1204) in the customer workload 26 to ensure the customer workload 26 is healthy and resilient to downtimes.

Figure 13:
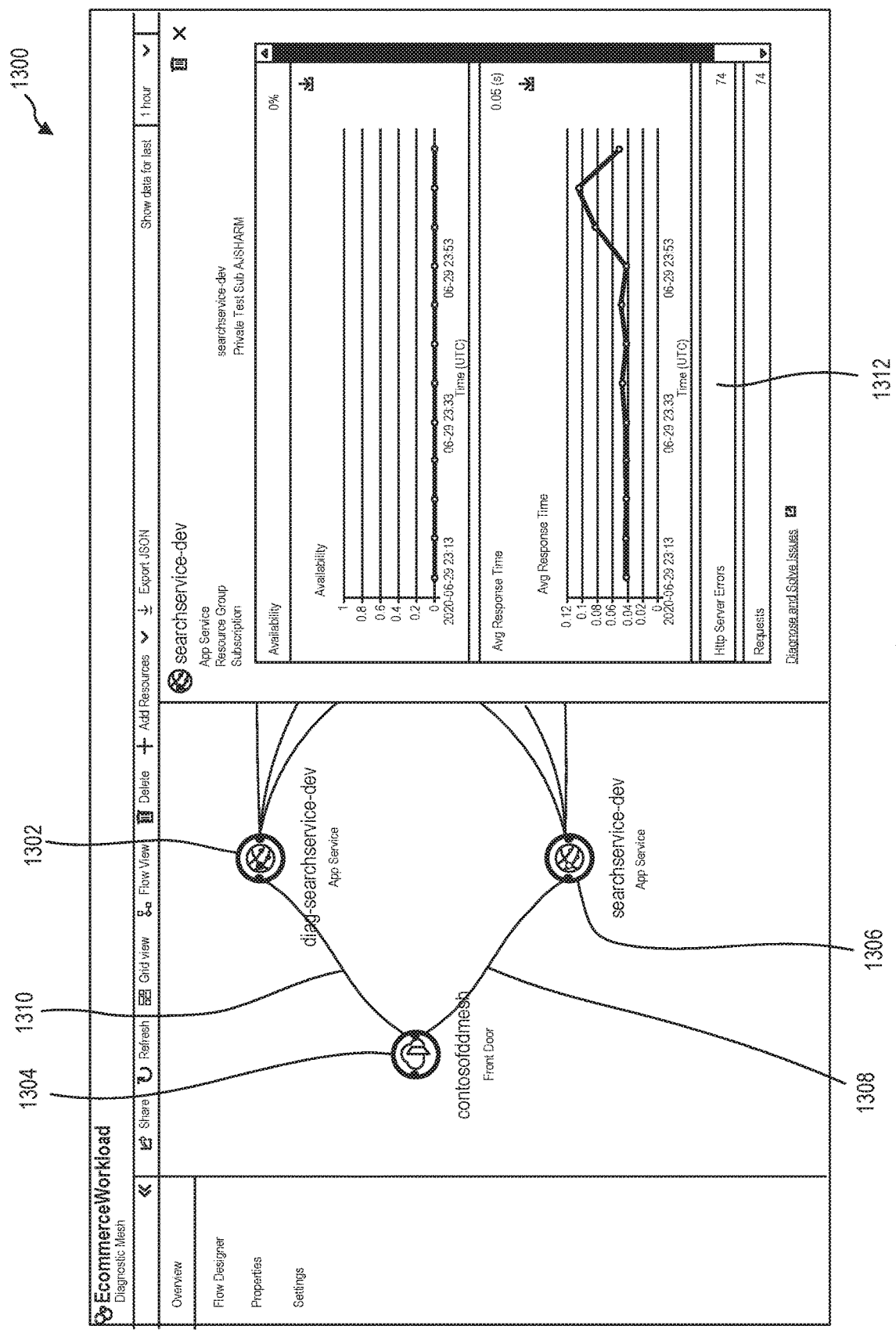
FIG. 13 illustrates an example user interface screen illustrating an example resource mesh in accordance with an implementation of the present disclosure.

Referring now to FIG. 13, illustrated is an example user interface screen 1300 illustrating an example resource mesh 46 (FIG. 3). The resource mesh 46 may include a plurality of resources 1302, 1304, 1306. The resource mesh may visually represent the dependencies between the different resources 1302, 1304, 1306. For example, a line 1310 may illustrate a dependency between the resource 1302 and the resource 1304 and another line 1308 may illustrate a dependency between the resource 1304 and the resource 1306. A customer 202 may use the resource mesh 46 to easily identify which resources 1302, 1304, 1306 may be affected if a resource has a problem or goes down.

User interface 1300 may also include a graph 1312 illustrating one or more problems for the plurality of resources 1302, 1304, 1306. The graph 1312 may illustrate information observed by one or more detectors 16 on the backend telemetry data 24 for the plurality of resources 1302, 1304, 1306. A customer 202 may use the graph 1312 to identify one or more resources 1302, 1304, 1306 that may need to be fixed.

Each of the components described herein may be in communication with each other using any suitable communication technologies. In addition, while the components are shown to be separate, any of the components or subcomponents may be combined into fewer components, such as into a single component, or divided into more components as may serve a particular implementation.

Moreover, the components may include hardware, software, or both. For example, the components may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. When executed by the one or more processors, the computer-executable instructions of one or more computing devices can perform one or more methods described herein. Alternatively, the components may include hardware, such as a special purpose processing device to perform a certain function or group of functions. Additionally, or alternatively, the components may include a combination of computer-executable instructions and hardware.

Instructions and data may be stored in memory. The instructions may be executable by the processor to implement some or all of the functionality disclosed herein. Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving, via an interactive interface, a problem with a customer workload running on a cloud service provider;
comparing the problem to search terms of a plurality of detectors, wherein the search terms describe issues that the plurality of detectors address;
automatically selecting a subset of detectors from the plurality of detectors to identify and run backend telemetry data for the customer workload in response to a match occurring between a search term for each detector in the subset of detectors and the problem with the customer workload, wherein the subset of detectors includes a new detector created for a portion of the problem in response to determining that none of the search terms match the portion of the problem;
using the subset of detectors to generate one or more insights identifying a cause of the problem in response to analyzing the backend telemetry data;
receiving, via the interactive interface, the one or more insights for the problem automatically generated by the subset of detectors, wherein the one or more insights provide a summary of issues observed in the backend telemetry data and at least one recommended action to fix the issues; and
using the interactive interface to perform the at least one recommended action to fix the issues with the customer workload.

2. The method of claim 1, wherein the interactive interface provides at least one of text, visual cues, charts, or actional next steps in the interactive interface to guide a user in solving the problem with the customer workload.

3. The method of claim 1, wherein the one or more insights provide interactive visuals and contextual information that provide a description summarizing the backend telemetry data explaining why the issues are occurring in the customer workload.

4. The method of claim 1, further comprising:
running a natural language processing (NLP) search on the problem; and
identifying one or more issues for the customer workload based on the NLP search.

5. The method of claim 4, wherein the
search term includes key words or phrases that describe one or more problems the subset of detectors address.

6. The method of claim 1, wherein the at least one recommended action to fix the issues with the customer workload is automatically performed in response to a user selecting an icon on the interactive interface to fix the issues.

7. The method of claim 1, further comprising:
receiving, via the interactive interface, one or more recommendations for a user to take to improve the customer workload, wherein the one or more recommendations are generated in response to one or more detectors analyzing the backend telemetry data of the customer workload and performing checks on the backend telemetry data.

8. The method of claim 1, further comprising:
using the interactive interface to establish proactive tooling to automatically run on the customer workload and identify when the customer workload exceeds a threshold; and
automatically taking mitigative actions by the proactive tooling to fix the issues with the customer workload.

9. The method of claim 1, wherein the interactive interface automatically selects the subset of detectors in response to search terms of the subset of detectors matching words describing the problem.

10. The method of claim 1, wherein the backend telemetry data includes information required to troubleshoot the problem.

11. The method of claim 1, wherein the plurality of detectors are automatically selected for the problem in response to the plurality of detectors matching words describing the problem, and the plurality of detectors automatically identify and run the backend telemetry data for the customer workload.

12. The method of claim 1, wherein the search terms include different scenarios for use of the plurality of detectors.

13. A method, comprising:
using a plurality of detectors to automatically identify and run backend telemetry data for a plurality of resources running on a cloud service;
using the plurality of detectors to analyze the backend telemetry data for each resource of the plurality of resources;
determining a resource health for each resource of the plurality of resources running on the cloud service in response to analyzing the backend telemetry data;
displaying, on an interactive interface, a resource mesh that visually represents resource dependencies of the plurality of resources and the resource health of each resource of the plurality of resources;
comparing a plurality of issues identified in the resource health for each resource to search terms of the plurality of detectors, wherein the search terms describe issues that the plurality of detectors address;
automatically selecting a subset of the plurality of detectors to identify resource problems for the plurality of resources in response to a match occurring between search terms of the subset of the plurality of detectors and the plurality of issues identified in the resource health, wherein the subset of detectors includes a new detector created for a portion of the plurality of issues in response to determining that none of the search terms match the portion of the plurality of issues;
using the subset of the plurality of detectors to provide one or more insights in response to analyzing the backend telemetry data for the resource problems;
receiving, via the interactive interface, the one or more insights automatically generated by the subset of the plurality of detectors, wherein the one or more insights provide a summary of the resource problems observed in the backend telemetry data and at least one recommended action to fix the resource problems;
using the interactive interface to perform the at least one recommended action to fix the resource problems with a customer workload for each resource of the plurality of resources.

14. The method of claim 13, wherein the at least one recommended action identifies two or more resources of the plurality of resources to fix based on the resource dependencies of the two or more resources.

15. The method of claim 13, wherein the plurality of resources includes all resources a user is running on the cloud service.

16. The method of claim 13, further comprising:
saving the new detector in a datastore, wherein the new detector is a custom detector tailored for a resource of the plurality of resources.

17. The method of claim 13, wherein the resource mesh provides a visual overview of the plurality of resources, the resource dependencies, and the resource health.

18. The method of claim 13, further comprising:
providing recommendations for fixing potential issues with the plurality of resources; and
implementing the recommendations to keep the customer workload resilient to downtimes.

19. The method of claim 13, wherein the resource mesh visually illustrates the resource dependencies using a line between resources in a graph and the graph is used to identify which resources are dependent on a resource with a problem.

20. The method of claim 13, wherein the resource health is determined in response to information received from each resource of the plurality of resources while running on the cloud service.

* * * * *